US011997034B2

(12) United States Patent
Kutz et al.

(10) Patent No.: US 11,997,034 B2
(45) Date of Patent: May 28, 2024

(54) CONTROL OF SCRAMBLING SEQUENCE PER SYMBOL FOR DIGITAL POST DISTORTION

(71) Applicant: QUALCOMM Incorporated, San Diego, CA (US)

(72) Inventors: Gideon Shlomo Kutz, Ramat Hasharon (IL); Assaf Touboul, Netanya (IL); Ronen Shaked, Kfar Saba (IL); Elad Meir, Ramat Gan (IL); Amit Bar-Or Tillinger, Tel-Aviv (IL); Yaniv Eistein, Tel Aviv (IL); Michael Levitsky, Rehovot (IL); Shay Landis, Hod Hasharon (IL); Tal Oved, Modiin (IL)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 17/319,536

(22) Filed: May 13, 2021

(65) Prior Publication Data
US 2022/0368484 A1 Nov. 17, 2022

(51) Int. Cl.
*H04L 5/00* (2006.01)
*H04L 25/02* (2006.01)
(Continued)

(52) U.S. Cl.
CPC ........ *H04L 5/0048* (2013.01); *H04L 25/0224* (2013.01); *H04L 25/03866* (2013.01); *H04W 72/21* (2023.01); *H04W 72/23* (2023.01)

(58) Field of Classification Search
None
See application file for complete search history.

(56) References Cited

U.S. PATENT DOCUMENTS 10,091,231 B1 * 10/2018 Gates ................. H04L 63/1425
10,187,180 B2 * 1/2019 Sorrentino ............ H04L 1/0026
(Continued)

FOREIGN PATENT DOCUMENTS

GB          2547041 A      8/2017
KR       20200005807 A     1/2020

OTHER PUBLICATIONS

Mabrouk M.B., et al., "A New Baseband Post-Distortion Technique for Power Amplifiers in OFDM-Based Cognitive Radio Systems", 2015 IEEE International Symposium on Circuits and Systems (ISCAS), IEEE, May 24, 2015, pp. 1486-1489, XP033183458, DOI: 10.1109/ISCAS.2015.7168926.
(Continued)

*Primary Examiner* — Hassan A Phillips
*Assistant Examiner* — Gautam Sharma
(74) *Attorney, Agent, or Firm* — Holland & Hart LLP

(57) ABSTRACT

Methods, systems, and devices for wireless communications are described. A transmitting device may select a scrambling sequence to use per symbol to reduce variance in a non-linearity parameter for a power amplifier (PA) output between a data symbol and a pilot symbol based on a PA model for at least one pilot symbol or one or more parameters of the model. The receiving device may indicate a capability to blindly estimate the scrambling sequence the transmitting device selected to the transmitting device. If the transmitting device does not receive the capability message from the receiving device or if the capability message indicates the receiving device is not capable of blind estimation, the transmitting device may indicate the selected scrambling sequence to the receiving device. Otherwise, the transmitting device may not indicate the selected scrambling sequence to the receiving device, and the receiving device may blindly estimate the scrambling sequence.

26 Claims, 12 Drawing Sheets

(51) Int. Cl.
*H04L 25/03* (2006.01)
*H04W 72/21* (2023.01)
*H04W 72/23* (2023.01)

(56) References Cited

U.S. PATENT DOCUMENTS

| | | | | |
|---|---|---|---|---|
| 10,225,826 | B2* | 3/2019 | Tiirola | H04B 1/713 |
| 10,374,672 | B2* | 8/2019 | Onggosanusi | H04B 7/0626 |
| 11,523,349 | B1* | 12/2022 | Huang | H04W 72/23 |
| 11,683,705 | B2* | 6/2023 | You | H04W 72/0453 |
| | | | | 370/329 |
| 11,765,660 | B2* | 9/2023 | Kim | H04W 52/0251 |
| | | | | 370/318 |
| 2010/0068993 | A1* | 3/2010 | Khan | H04B 7/1853 |
| | | | | 455/12.1 |
| 2010/0177694 | A1* | 7/2010 | Yang | H04L 5/0053 |
| | | | | 370/328 |
| 2011/0274031 | A1* | 11/2011 | Gaal | H04L 5/0051 |
| | | | | 370/315 |
| 2012/0317448 | A1* | 12/2012 | Li | H04L 41/0686 |
| | | | | 714/57 |
| 2013/0163532 | A1* | 6/2013 | Anderson | H04L 5/0053 |
| | | | | 370/329 |
| 2013/0163536 | A1* | 6/2013 | Anderson | H04L 5/0007 |
| | | | | 370/329 |
| 2014/0254530 | A1* | 9/2014 | Kim | H04L 5/005 |
| | | | | 370/329 |
| 2016/0337103 | A1* | 11/2016 | Kim | H04W 72/21 |
| 2017/0071005 | A1* | 3/2017 | Kato | H04B 1/707 |
| 2017/0257786 | A1 | 9/2017 | Eitan et al. | |
| 2019/0253219 | A1* | 8/2019 | Fan | H04L 5/001 |
| 2020/0187265 | A1* | 6/2020 | Luo | H04J 13/10 |
| 2021/0321419 | A1* | 10/2021 | Li | H04L 27/2602 |
| 2022/0368484 | A1* | 11/2022 | Kutz | H04L 5/0048 |

OTHER PUBLICATIONS

Partial International Search Report—PCT/US2022/028339—ISA/EPO—dated Aug. 11, 2022.
International Search Report and Written Opinion—PCT/US2022/028339—ISA/EPO—dated Sep. 20, 2022.

* cited by examiner

CONTROL OF SCRAMBLING SEQUENCE PER SYMBOL FOR DIGITAL POST DISTORTION

FIELD OF TECHNOLOGY

The following relates to wireless communications, including control of scrambling sequence per symbol for digital post distortion (DPoD).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support control of scrambling sequence per symbol for digital post distortion (DPoD). Generally, the described techniques provide for a transmitting device to select a scrambling sequence to use per symbol period to reduce variance in a non-linearity parameter for a power amplifier (PA) output between data resource elements and a corresponding pilot resource element within the symbol period. The transmitting device may select a scrambling sequence based on a PA model for at least one pilot resource element or one or more parameters of the model. In some examples, the receiving device may be capable of blindly estimating the scrambling sequence that the transmitting device selected. The receiving device may indicate the capability to blindly estimate the scrambling sequence to the transmitting device in control signaling. If the transmitting device does not receive the capability message from the receiving device or if the capability message indicates the receiving device is not capable of blind estimation, the transmitting device may indicate the selected scrambling sequence to the receiving device in control signaling. Otherwise, the transmitting device may not indicate the selected scrambling sequence to the receiving device, and the receiving device may blindly estimate the scrambling sequence. For example, the modulation order may implicitly indicate whether or not the transmitting device selected the scrambling selection (e.g., the selection might be done for higher order quadrature amplitude modulation (QAM)).

A method for wireless communications at a first wireless device is described. The method may include selecting a first scrambling sequence from a set of candidate scrambling sequences based on a value of a non-linearity parameter for a set of data resource elements for transmitting data in one or more symbol periods and a set of pilot resource elements for transmitting DMRSs associated with the data in the one or more symbol periods, encoding the data for the set of data resource elements according to the first scrambling sequence, and transmitting, in the one or more symbol periods, the set of data resource elements with the set of pilot resource elements.

An apparatus for wireless communications at a first wireless device is described. The apparatus may include a processor, memory coupled with the processor, and instructions stored in the memory. The instructions may be executable by the processor to cause the apparatus to select a first scrambling sequence from a set of candidate scrambling sequences based on a value of a non-linearity parameter for a set of data resource elements for transmitting data in one or more symbol periods and a set of pilot resource elements for transmitting DMRSs associated with the data in the one or more symbol periods, encode the data for the set of data resource elements according to the first scrambling sequence, and transmit, in the one or more symbol periods, the set of data resource elements with the set of pilot resource elements.

Another apparatus for wireless communications at a first wireless device is described. The apparatus may include means for selecting a first scrambling sequence from a set of candidate scrambling sequences based on a value of a non-linearity parameter for a set of data resource elements for transmitting data in one or more symbol periods and a set of pilot resource elements for transmitting DMRSs associated with the data in the one or more symbol periods, means for encoding the data for the set of data resource elements according to the first scrambling sequence, and means for transmitting, in the one or more symbol periods, the set of data resource elements with the set of pilot resource elements.

A non-transitory computer-readable medium storing code for wireless communications at a first wireless device is described. The code may include instructions executable by a processor to select a first scrambling sequence from a set of candidate scrambling sequences based on a value of a non-linearity parameter for a set of data resource elements for transmitting data in one or more symbol periods and a set of pilot resource elements for transmitting DMRSs associated with the data in the one or more symbol periods, encode the data for the set of data resource elements according to the first scrambling sequence, and transmit, in the one or more symbol periods, the set of data resource elements with the set of pilot resource elements.

Some examples of the method, apparatuses, and non-transitory computer-readable medium described herein may further include operations, features, means, or instructions for transmitting, to a second wireless device, control signaling indicating the first scrambling sequence.

In some examples of the method, apparatuses, and non-transitory computer-readable medium described herein, transmitting the control signaling may include operations, features, means, or instructions for transmitting a downlink control information (DCI) message including one or more bits indicating the first scrambling sequence, where the second wireless device may be a user equipment (UE).

In some examples of the method, apparatuses, and non-transitory computer-readable medium described herein, transmitting the control signaling may include operations, features, means, or instructions for transmitting an uplink control information (UCI) message including one or more bits indicating the first scrambling sequence, where the second wireless device may be a base station.

Some examples of the method, apparatuses, and non-transitory computer-readable medium described herein may further include operations, features, means, or instructions for receiving, from a second wireless device, an indication of a capability of the second wireless device to blindly estimate the first scrambling sequence, where selecting the first scrambling sequence from the set of candidate scrambling sequences may be based on the received indication.

Some examples of the method, apparatuses, and non-transitory computer-readable medium described herein may further include operations, features, means, or instructions for performing, for each set of one or more symbol periods, an estimation procedure to evaluate the non-linearity parameter corresponding to each scrambling sequence from the set of candidate scrambling sequences for the one or more symbol periods and identifying the first scrambling sequence based on performing the estimation procedure.

In some examples of the method, apparatuses, and non-transitory computer-readable medium described herein, performing the estimation procedure may include operations, features, means, or instructions for determining, for each set of one or more symbol periods, a peak-to-average-power ratio (PAPR) corresponding to the each scrambling sequence from the set of candidate scrambling sequences and selecting the first scrambling sequence based on comparing the calculated PAPR corresponding to the each scrambling sequence from the set of candidate scrambling sequences.

In some examples of the method, apparatuses, and non-transitory computer-readable medium described herein, a first PAPR of the first scrambling sequence may be a lowest value of each of the calculated PAPRs corresponding to the each scrambling sequence.

Some examples of the method, apparatuses, and non-transitory computer-readable medium described herein may further include operations, features, means, or instructions for selecting the first scrambling sequence from the set of candidate scrambling sequences may be performed once per group of symbol periods.

In some examples of the method, apparatuses, and non-transitory computer-readable medium described herein, the group of symbol periods includes one slot.

In some examples of the method, apparatuses, and non-transitory computer-readable medium described herein, a PAPR for the data from each of the one or more symbol periods encoded according to the first scrambling sequence satisfies a threshold value or may be a minimum value for the PAPR among a set of PAPRs.

Some examples of the method, apparatuses, and non-transitory computer-readable medium described herein may further include operations, features, means, or instructions for selecting the first scrambling sequence may be based on a modulation order of the set of data resource elements having a number of points that satisfies a threshold number of points.

A method for wireless communications at a second wireless device is described. The method may include receiving, from a first wireless device, a set of data resource elements in one or more symbol periods, the set of data resource elements including data and a set of pilot resource elements including demodulation reference signals (DMRSs) associated with the data in the one or more symbol periods, identifying, from a set of candidate scrambling sequences, a first scrambling sequence used by the first wireless device to scramble the data, and decoding the data of the set of data resource elements according to the first scrambling sequence.

An apparatus for wireless communications at a second wireless device is described. The apparatus may include a processor, memory coupled with the processor, and instructions stored in the memory. The instructions may be executable by the processor to cause the apparatus to receive, from a first wireless device, a set of data resource elements in one or more symbol periods, the set of data resource elements including data and a set of pilot resource elements including DMRSs associated with the data in the one or more symbol periods, identify, from a set of candidate scrambling sequences, a first scrambling sequence used by the first wireless device to scramble the data, and decode the data of the set of data resource elements according to the first scrambling sequence.

Another apparatus for wireless communications at a second wireless device is described. The apparatus may include means for receiving, from a first wireless device, a set of data resource elements in one or more symbol periods, the set of data resource elements including data and a set of pilot resource elements including DMRSs associated with the data in the one or more symbol periods, means for identifying, from a set of candidate scrambling sequences, a first scrambling sequence used by the first wireless device to scramble the data, and means for decoding the data of the set of data resource elements according to the first scrambling sequence.

A non-transitory computer-readable medium storing code for wireless communications at a second wireless device is described. The code may include instructions executable by a processor to receive, from a first wireless device, a set of data resource elements in one or more symbol periods, the set of data resource elements including data and a set of pilot resource elements including DMRSs associated with the data in the one or more symbol periods, identify, from a set of candidate scrambling sequences, a first scrambling sequence used by the first wireless device to scramble the data, and decode the data of the set of data resource elements according to the first scrambling sequence.

In some examples of the method, apparatuses, and non-transitory computer-readable medium described herein, identifying the first scrambling sequence may include operations, features, means, or instructions for receiving, from the first wireless device, control signaling indicating the first scrambling sequence.

In some examples of the method, apparatuses, and non-transitory computer-readable medium described herein, receiving the control signaling may include operations, features, means, or instructions for receiving a DCI message including one or more bits indicating the first scrambling sequence, where the first wireless device may be a base station.

In some examples of the method, apparatuses, and non-transitory computer-readable medium described herein, receiving the control signaling may include operations, features, means, or instructions for receiving an UCI message including one or more bits indicating the first scrambling sequence, where the first wireless device may be a UE.

Some examples of the method, apparatuses, and non-transitory computer-readable medium described herein may further include operations, features, means, or instructions for performing a measurement of a channel corresponding to the set of data resource elements and estimating the first scrambling sequence based on the measurement of the channel.

Some examples of the method, apparatuses, and non-transitory computer-readable medium described herein may further include operations, features, means, or instructions for transmitting, to the first wireless device, an indication of a capability of the second wireless device to blindly estimate the first scrambling sequence, where estimating the first scrambling sequence may be based on the capability.

In some examples of the method, apparatuses, and non-transitory computer-readable medium described herein, the first scrambling sequence may be used to decode the data for one group of symbol periods.

In some examples of the method, apparatuses, and non-transitory computer-readable medium described herein, the group of symbol periods includes one slot.

In some examples of the method, apparatuses, and non-transitory computer-readable medium described herein, a PAPR for the data from each of the one or more symbol periods satisfies a threshold value or may be a minimum value for the PAPR among a set of PAPRs.

Some examples of the method, apparatuses, and non-transitory computer-readable medium described herein may further include operations, features, means, or instructions for identifying the first scrambling sequence may be based on a modulation order of the set of data resource elements having a number of points that satisfies a threshold number of points.

DETAILED DESCRIPTION

Figure 1:
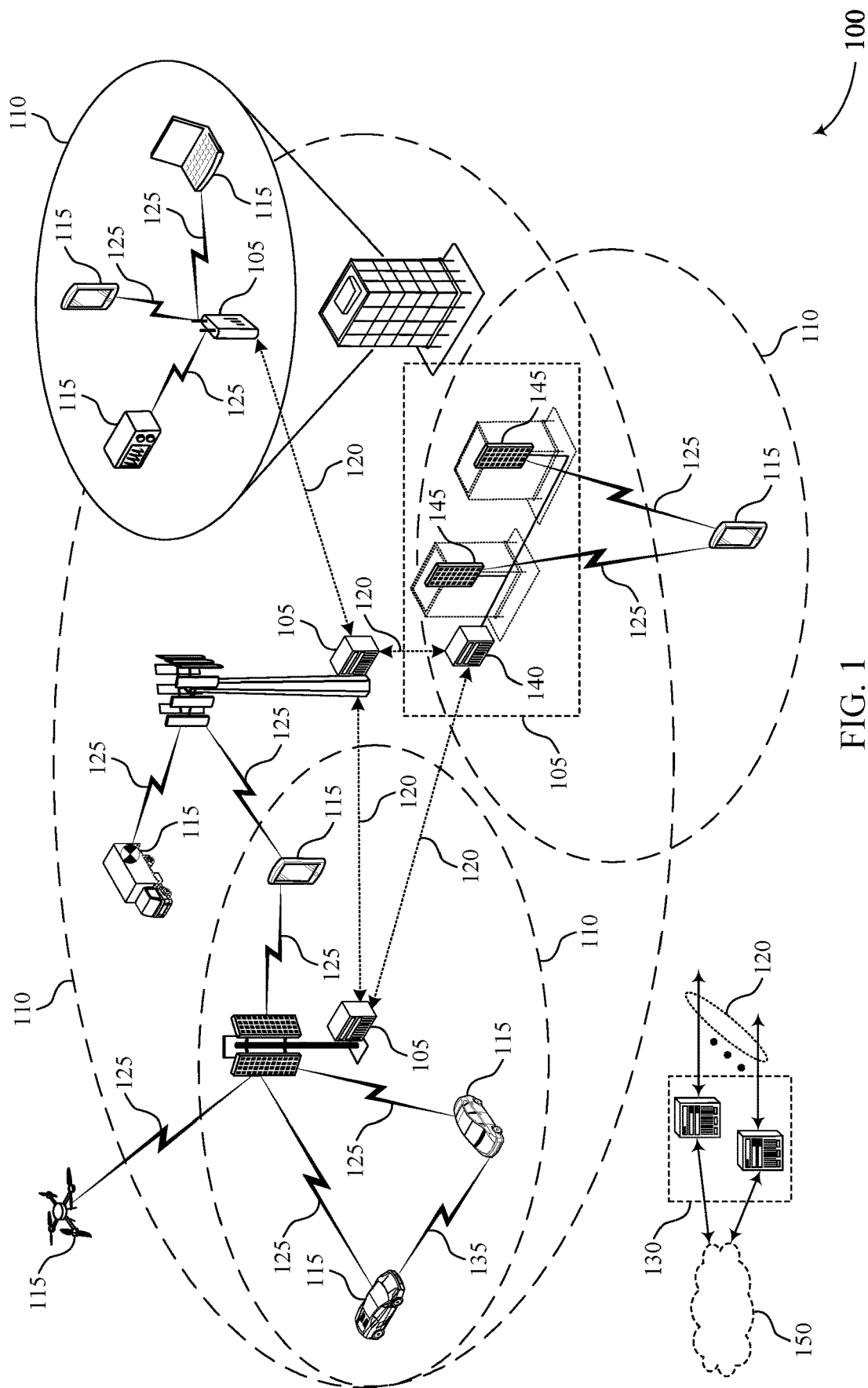
FIGS. 1 and 2 illustrate examples of wireless communications systems that support control of scrambling sequence per symbol for digital post distortion (DPoD) in accordance with aspects of the present disclosure.

In some wireless communications systems, a transmitting device (e.g., a user equipment (UE), a base station, or the like) may transmit data or control signaling using a power amplifier (PA). For example, the transmitting device may input the signaling to the PA and may transmit the output to a receiving device. The power output may increase linearly for relatively low input values. However, as the power output reaches relatively high values (e.g., higher than some threshold value), the power output may increase according to a nonlinear scale. The point at which the power output increases to a nonlinearity value may be referred to as a PA compression point. In some examples, the transmitting device may transmit signaling close to the PA compression point and may compensate for any nonlinearities introduced by the PA at the receiving device. The receiving device may estimate a PA nonlinearity model of the transmitting device based on a reference signal (e.g., a demodulation reference signal (DMRS)) and may reduce or remove the nonlinearity impairment for each incoming symbol period using the estimated PA model, such as a corresponding data resource element. However, different resource elements may have different nonlinearity values. Thus, the data resource elements may experience higher nonlinearities than the corresponding reference signal. Thus, the PA model may not accurately estimate the nonlinearity impairment for the data resource elements, which may cause errors related to interference from the incorrect PA modeling.

As described herein, a transmitting device may select a scrambling sequence (e.g., from a pool of two or more scrambling sequences) to apply to each symbol period for a data transmission to a receiving device. The scrambling sequence may be a numerical sequence such as a Zadoff Chu sequence, a Gold sequence, a pseudo random sequence, a low correlation sequence, or the like, used to scramble or descramble/unscramble a transmission, for example, by encoding a transmission using the scrambling sequence or, in the case of a receiver, decoding a scrambled transmission using the scrambling sequence. In some cases, the transmitting device may select a scrambling sequence to use for each symbol period to reduce mismatch between PA modeling for a reference signal and corresponding data resource element, which may also reduce the variance in peak-to-average-power ratio (PAPR) for each symbol period. In some cases, the transmitting device may select the scrambling sequence from a pool of scrambling sequences (e.g., a predetermined pool). The transmitting device may select the scrambling sequence based on modeling the PA and resulting PAPR for each symbol period (e.g., because the model may be different depending on the data in each symbol period). Additionally or alternatively, the transmitting device may select the scrambling sequence based on a PAPR value, such as selecting a scrambling sequence that minimizes the PAPR value. For example, the transmitting device may perform the PA modeling and may scramble each symbol period of a data transmission according to a selected scrambling sequence. The transmitting device may transmit control signaling including an indication of the selected scrambling sequence for each symbol period. For example, the transmitting device may include a one bit indicator in the control signaling indicating a scrambling sequence for each symbol period (e.g., on a per symbol basis or a per slot basis) or indicating a baseline distribution with no scrambling control. In some other examples, the receiving device may blindly estimate the scrambling sequence by measuring frequency coherency of an estimated channel. In some cases, the receiving device may transmit capability information to the transmitting device indicating whether the receiving device may blindly estimate the scrambling sequence. The transmitting device may or may not transmit an indicator of the scrambling sequence to the receiving device based on the capability information (e.g., if the receiving device is capable of performing blind estimation, the transmitting device may refrain from or otherwise not send the indicator).

Aspects of the disclosure are initially described in the context of wireless communications systems. Aspects of the disclosure are further described in the context of a device diagram and a process flow. Aspects of the disclosure are further illustrated by and described with reference to apparatus diagrams, system diagrams, and flowcharts that relate to control of scrambling sequence per symbol for digital post distortion.

FIG. 1 illustrates an example of a wireless communications system 100 that supports control of scrambling sequence per symbol for digital post distortion in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a wireless device, such as a base station or a UE, may transmit data or control signaling to a receiving device using a PA to amplify a signal. For example, the transmitting device may input the signaling to the PA and may transmit the output to a receiving device, which may be another wireless device, such as a UE. Similarly, the receiving device may implement a PA when receiving the signaling from the transmitting device. The power output of the PA may increase linearly for relatively low input values. However, as the power output of the PA reaches relatively high values (e.g., above some threshold power output level), the power output may increase according to a nonlinear scale. The point at which the power output increases to a nonlinearity value may be referred to as a PA compression point. In some examples, the transmitting device may operate using a digital post distortion (DPoD), which may involve transmitting close to the PA compression point to compensate for the non-linearities induced by the PA at the receiver side. In some cases, DPoD techniques may be based on modeling a non-linearity impairment (e.g., a non-linearity parameter) based on one or more pilot resource elements (e.g., related to one or more DMRSs), and subtracting the estimated value from a received signal through an iterative process. However, one or more data resource elements (e.g., including time and frequency resources) may experience higher non-linearities than a corresponding DMRS symbol, which may cause a PA model mismatch between estimating the model and applying the model.

In some cases, to resolve the mismatch, a transmitting device may select a scrambling sequence to use per symbol period from a pool of sequences to reduce variance in a non-linearity parameter for a PA output between the data resource elements and the pilot resource elements within the symbol period. The transmitting device may select a scrambling sequence based on a PA model for at least one pilot resource element or one or more parameters of the model. In some examples, the receiving device may be capable of blindly estimating the scrambling sequence the transmitting device selected. The receiving device may indicate the capability to blindly estimate the scrambling sequence to the transmitting device in control signaling. If the transmitting device does not receive the capability message from the receiving device or if the capability message indicates the receiving device is not capable of blind estimation, the transmitting device may indicate the selected scrambling sequence to the receiving device in control signaling. Otherwise, the transmitting device may not indicate the selected scrambling sequence to the receiving device, and the receiving device may blindly estimate the scrambling sequence.

Figure 2:
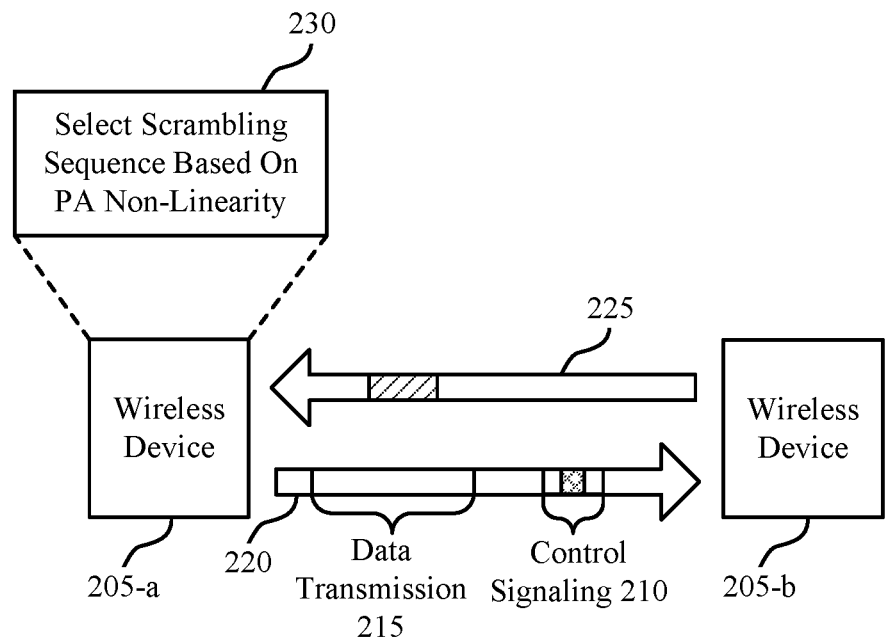

FIG. 2 illustrates an example of a wireless communications system 200 that supports control of scrambling sequence per symbol for DPoD in accordance with aspects of the present disclosure. In some examples, wireless communications system 200 may implement aspects of wireless communication system 100 and may include wireless devices 205, which may be examples of a UE 115, a base station 105, a TRP, a relay, or other network node as described with reference to FIG. 1. In some examples, wireless device 205-a may and wireless device 205-b may communicate control signaling 210, data transmissions 215, or both using downlink communication link 220 and uplink communication link 225. For example, wireless device 205-a may scramble a data transmission 215 on downlink communication link 220 to wireless device 205-b according to a selected scrambling sequence.

In some examples, wireless device 205-a may be an example of a transmitting device, such as a base station or a UE. Wireless device 205-a may transmit data or control signaling using a PA. For example, wireless device 205-a may input the signaling to the PA and may transmit the output to wireless device 205-b, which may be an example of a receiving device, such as a UE. Similarly, wireless device 205-b may implement a PA when receiving the signaling from wireless device 205-a. The power output of the PA may increase linearly for relatively low input values. However, as the power output of the PA reaches relatively high values, the power output may increase according to a nonlinear scale. The point at which the power output increases to a nonlinearity value may be referred to as a PA compression point.

In some examples, wireless device 205-a may operate using a DPoD technique in which wireless device 205-a may transmit close to the PA compression point to compensate for the non-linearities induced by the PA at the receiver side. For example, in some wireless communication systems operating according to higher order quadrature amplitude modulation (QAM), such as 1024 QAM or above (e.g., which may be referred to as superQAM in some cases), a wireless device 205 using DPoD techniques may transmit at a higher power with improve signal-to-noise ratio (SNR) and transmission capacity. In a superQAM system without DPoD, the wireless device 205 may have a relatively high error vector magnitude (EVM) and a relatively large PA back-off (e.g., below the PA compression point), which may reduce a communication range.

In some cases, DPoD techniques may be based on modeling a non-linearity impairment (e.g., a non-linearity parameter) as an additive signal. The modeling may include estimating the non-linearity component of the signal, which may be referred to as a nonlinearity parameter, and subtracting the estimated value from a received signal through an iterative process. For example, a receiving device, such as wireless device 205-b, may estimate a PA non-linearity model for one or more symbol periods. Each symbol period may include one or more resource elements across a set of subcarriers. The resource elements may include resource elements for cell-specific reference signals, such as DMRSs (e.g., pilot resource elements), and resource elements for data (e.g., data resource elements). The resource elements may span one or more symbol periods and may include time-frequency resources. The receiving device may remove the non-linearity impairment on each of the data resource elements using the estimated PA model. In some cases, the non-linearity parameter may be dependent on the data and therefore may vary per data resource element. Specifically, the distribution of the symbol time domain signal peaks and overall signal PAPR may vary based on the data.

In some examples, the peak distribution may vary between data resource elements and an associated pilot resource element (e.g., a DMRS). That is, one or more data resource elements may experience higher non-linearities than a corresponding DMRS symbol, which may cause an error floor of DPoD performance for a DMRS waveform as well as a PA model mismatch between estimating the model and applying the model (e.g., since the estimation may not learn the PA behavior at the high non-linearity condition experienced by the data resource element).

In some cases, to resolve the mismatch, a transmitting device may select a scrambling sequence used per symbol period (e.g., per OFDM symbol) from a pool of sequences to reduce variance in a non-linearity parameter for a PA output between the data resource elements and the pilot resource element. For example, at 230, wireless device 205-a may select a scrambling sequence based on a PA non-linearity (e.g., a PA model based on at least one pilot resource element or one or more parameters of the model). Wireless device 205-a may select from a pre-determined pool of scrambling sequences, may receive an indication (e.g., in control signaling) of the pool of scrambling sequences, or the like. The pool of scrambling sequences may include two sets of scrambling sequences. In some cases, the PAPR for one or more symbols may be reduced based on reducing the variance in the PA non-linearity between a pilot resource element and a corresponding data resource element.

In some examples, wireless device 205-b may determine a capability to blindly estimate the scrambling sequence wireless device 205-a selected. For example, wireless device 205-b may measure a frequency coherence of a channel (e.g., an estimated channel) to determine which scrambling sequence wireless device 205-a selected. Wireless device 205-b may identify incorrect scrambling sequences based on if there is a relatively large, or non-realistic, delay spread estimation or a relatively low frequency coherency. Wireless device 205-b may indicate the capability to blindly estimate the scrambling sequence to wireless device 205-a in a capability message 235. The wireless device 205-b may include the capability message 235 in control signaling to wireless device 205-a (e.g., a report, a field in UCI (UCI) or DCI (DCI), depending on transmission direction, or the like).

In some cases, wireless device 205-a may transmit control signaling 210 to wireless device 205-b (e.g., a DCI message, RRC signaling, a MAC-CE, or the like) including scheduling information for a data transmission 215. If wireless device 205-*a* does not receive the capability message 235 from wireless device 205-*b* or if the capability message 235 indicates wireless device 205-*b* is not capable of blind estimation, wireless device 205-*a* may include a scrambling sequence indication 240 in the control signaling 210. For example, wireless device 205-*a* may signal the scrambling sequence indication 240, which may include an indication of the selection at 230, to wireless device 205-*b* in a DCI message or UCI message, depending on communication direction, on a control channel (e.g., physical downlink control channel (PDCCH) or physical uplink control channel (PUCCH), respectively).

In some examples, the scrambling sequence indication 240 may indicate a baseline distribution, which may be a symbol distribution with no scrambling control. In some other examples, the scrambling sequence indication 240 may include a one bit indication of the scrambling sequence. The one bit indication may indicate a scrambling sequence per symbol, a scrambling sequence per slot (e.g., wireless device 205-*a* may scramble each symbol in the slot according to the indicated scrambling sequence), or a combination thereof. The scrambling sequence indication 240 that includes one bit per slot or one bit per symbol may significantly improve the PA model mismatch (e.g., a probability of a particular PAPR may decrease for one bit per slot by a first percentage, or to a second percentage (e.g., a lower percentage than the first percentage) for one bit per symbol).

Figure 3:
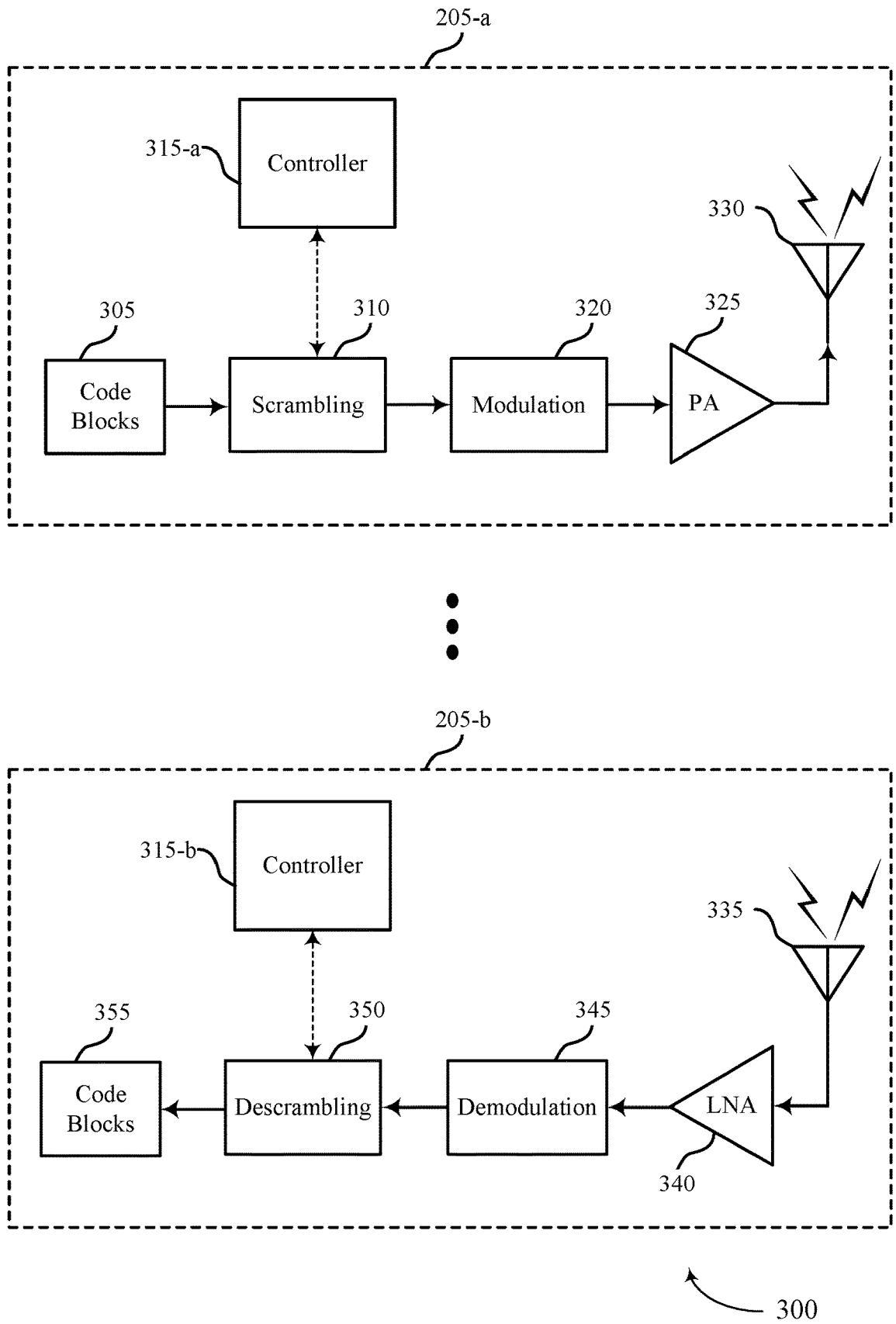
FIG. 3 illustrates an example of a device diagram that supports control of scrambling sequence per symbol for DPoD in accordance with aspects of the present disclosure.

FIG. 3 illustrates an example of a device diagram 300 that supports control of scrambling sequence per symbol for DPoD in accordance with aspects of the present disclosure. In some examples, device diagram 300 may implement aspects of wireless communication system 100 and wireless communications system 200. For example, device diagram may be implemented at a wireless device 205-*a* and a wireless device 205-*b*, which may be examples of UEs 115, base stations 105, or the like as described with reference to FIGS. 1 and 2. In some cases, wireless device 205-*a*, which may be a transmitting device such as a base station, may transmit control signaling, a data transmission, or both to a wireless device 205-*b*, which may be a receiving device such as a UE. For example, wireless device 205-*a* may transmit a data transmission in the form of one or more symbols (e.g., time and frequency resources) to wireless device 205-*b*, and wireless device 205-*b* may process the data transmission. Wireless device 205-*a* may scramble the data transmission based on a selected scrambling sequence. Wireless device 205-*a* and wireless device 205-*b* may represent simplified device diagrams, such that intermediate steps or blocks may be omitted for clarity, and the wireless devices may operate consistent with the techniques described herein with intermediate steps or blocks omitted or added.

In some examples, at 305, wireless device 205-*a* may identify or determine code blocks for a transmission to wireless device 205-*b*. The code blocks may include coded data bits that will be scrambled, modulated, and then mapped to one or more data resource elements. The pilot resource elements may include reference signals, such as DMRSs. At 310, controller 315-*a* of wireless device 205-*a* may scramble the code blocks according to a scrambling sequence. For example, wireless device 205-*a* may select a scrambling sequence from a pool of scrambling sequences (e.g., two pre-determined scrambling sequences) for the code blocks of a symbol period (or one or more symbol periods or slots). Wireless device 205-*a* may select the scrambling sequence based on a selection criteria, which may include a threshold PAPR for the data resource elements scrambled according to the scrambling sequence. For example, wireless device 205-*a* may compare one or more PAPR for data resource elements corresponding to different scrambling sequences, and may choose the scrambling sequence associated with a relatively low PAPR (e.g., below a threshold PAPR). In some examples, wireless device 205-*a* may determine the threshold PAPR based on a predetermined value, a value indicated in control signaling, the value of a PAPR for another data resource element or pilot resource element scrambled according to each scrambling sequence, or the like.

At 320, wireless device 205-*a* may perform a modulation operation using a modulation and coding scheme (MCS) for the code bits from the scrambled code blocks to a PA 325. The PA 325 may amplify the data resource elements and pilot resource elements that have been converted from a digital signal to an analog signal for amplification by the PA 325. The power output of the PA 325 may increase linearly for relatively low input values. However, as the power output of the PA 325 reaches relatively high values, the power output may increase according to a nonlinear scale. Wireless device 205-*a* may use one or more transmit antennas 330 to transmit the output of the PA 325 to wireless device 205-*b*.

On the receiving side, wireless device 205-*b* may receive the signaling from wireless device 205-*a* using one or more receive antennas 335. In some examples, wireless device 205-*b* may provide the received signaling to a low noise amplifier (LNA) 340 that may amplify the received signal. The amplified signal may then be converted from an analog signal to a digital signal. In some cases, the wireless device 205-*a* may transmit close to a PA compression point (e.g., of PA 325) which may introduce (or exacerbate) non-linearities induced by the PA 325. For example, wireless device 205-*a* may estimate a non-linearity parameter based on a PA non-linearity model for one or more pilot resource elements. The receiving device may remove the non-linearity impairment on each of the data resource elements using the estimated PA model. In some cases, the non-linearity parameter may be dependent on the data and therefore may vary per data resource element. That is, one or more data resource elements may experience higher non-linearities than a corresponding DMRS resource element, which may cause a PA model mismatch between estimating the model and applying the model. In some cases, to resolve the mismatch, wireless device 205-*a* may scramble the code block at 310 according to the selected scrambling sequence on a per symbol basis. Wireless device 205-*b* may be capable of blindly estimating which scrambling sequence wireless device 205-*a* used to scramble the code block or blocks associated with each symbol (e.g., based on comparing each scrambling sequence from the pool of scrambling sequences to one or more channel conditions). In some other cases, wireless device 205-*a* may transmit an indication of the selected scrambling sequence (e.g., in DCI or UCI with a one bit per symbol or one bit per slot indication). Wireless device 205-*a* may transmit the indication of the selected scrambling sequence based on a capability message from wireless device 205-*b* indicating the blind estimation capability.

At 345, wireless device 205-*b* may perform a demodulation operation on the received signal. At 350, controller 315-*b* of wireless device 205-*b* may descramble the demodulated signaling per symbol based on the scrambling sequence (e.g., either blindly estimating the scrambling sequence or receiving an indication of the scrambling sequence from wireless device 205-*b*). At 355, after descrambling the signaling, wireless device 205-*b* may have one or more decoded code blocks.

Figure 4:
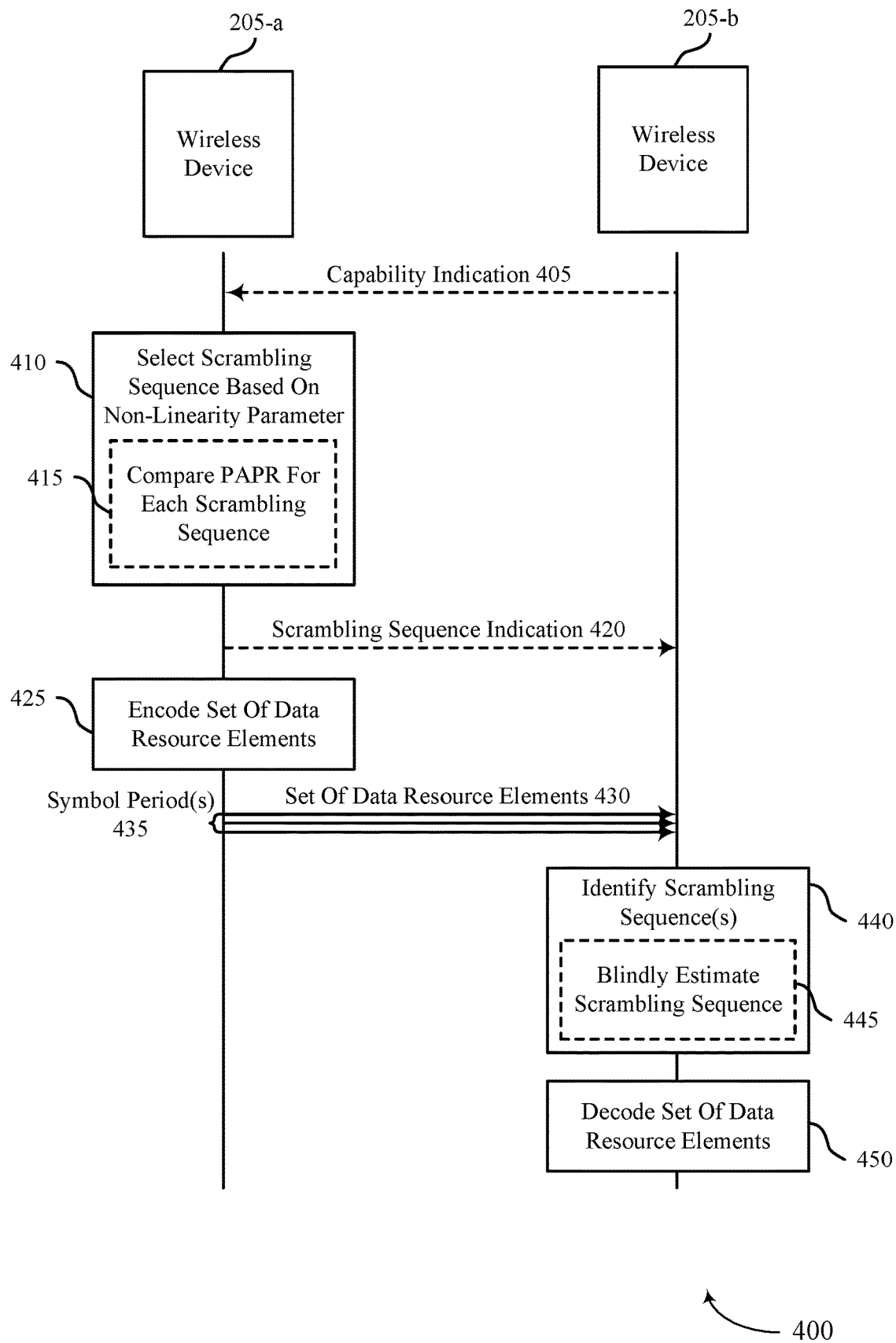
FIG. 4 illustrates an example of a process flow that supports control of scrambling sequence per symbol for DPoD in accordance with aspects of the present disclosure.

FIG. 4 illustrates an example of a process flow 400 that supports control of scrambling sequence per symbol for DPoD in accordance with aspects of the present disclosure. In some examples, process flow 400 may implement aspects of wireless communications system 100, wireless communications system 200, and device diagrams 300. The process flow 400 may illustrate an example of a wireless device 205-a, which may be an example of a base station 105, a UE 115, or any other transmitting device, selecting a scrambling sequence based on a non-linearity parameter for a data transmission to wireless device 205-b, which similarly may be an example of a base station 105, a UE 115, or any other receiving device. Alternative examples of the following may be implemented, where some processes are performed in a different order than described or are not performed. In some cases, processes may include additional features not mentioned below, or further processes may be added.

At 405, wireless device 205-b may determine a capability to blindly estimate a scrambling sequence selected by wireless device 205-a. Wireless device 205-b may transmit a capability indication to wireless device 205-b including the determined capability (e.g., in control signaling).

At 410, wireless device 205-a may select the scrambling sequence from a pool or set of candidate scrambling sequences based on a value of a non-linearity parameter for a set of data resource elements for transmitting data in one or more symbol periods and a set of pilot resource elements for transmitting DMRSs for the data in the one or more symbol periods. In some examples, wireless device 205-a may determine the pool of candidate scrambling sequences based on a predetermined pool (e.g., there may be two candidate scrambling sequences for each symbol period), based on control signaling, or based on other means. Wireless device 205-a may determine a non-linearity parameter from a PA model of the pilot resource elements, the data resource elements, or both. That is, wireless device 205-a may perform an estimation procedure for each symbol period (e.g., each OFDM symbol period) to evaluate the non-linearity parameter for each scrambling sequence from the pool of candidate scrambling sequences. Each symbol period may include one or more resource elements across a set of subcarriers. The resource elements may include resource elements for DMRSs (e.g., pilot resource elements) and resource elements for data (e.g., data resource elements). The resource elements may span one or more symbol periods. Wireless device may identify the scrambling sequence based on performing the estimation procedure. In some examples, selecting the scrambling sequence from the pool of candidate scrambling sequences is based on the capability indication received from wireless device 205-b at 405.

For example, at 415, wireless device 205-a may determine a PAPR for each scrambling sequence from the pool for a symbol period. Wireless device 205-a may select the scrambling sequence based on comparing the calculated PAPRs for each scrambling sequence. In some cases, wireless device 205-a may select the scrambling sequence with a lowest PAPR value for the symbol period (e.g., for data resource elements, pilot resource elements, or both within the symbol period). In some examples, wireless device 205-a may select the scrambling sequence based on the PAPR value satisfying a threshold value. The threshold value may be predetermined by wireless device 205-a, signaled in control signaling, or otherwise determined.

In some examples, wireless device 205-a may select the scrambling sequence once per group of symbol periods in a slot. In some cases, wireless device 205-a may select the scrambling sequence based on a modulation order of the set of data resource elements having a number of points that satisfy a threshold number of points (e.g., a QAM of at least 1024 QAM, which may be referred to as superQAM).

At 420, wireless device 205-a may transmit a scrambling sequence indication to wireless device 205-b. In some examples, if wireless device 205-a selects the scrambling sequence once per group of symbol periods, the scrambling sequence indication may include one bit per symbol period or one bit per slot. Wireless device 205-a may include the scrambling sequence indication in control signaling, such as DCI, UCI, a MAC-CE, or the like. For example, wireless device 205-a may transmit a DCI message to wireless device 205-b, the DCI message including one or more bits indicating the scrambling sequence, where wireless device 205-b is a UE. In some other examples, wireless device 205-b may transmit a UCI message to wireless device 205-b, the UCI message including one or more bits indicating the scrambling sequence, where wireless device 205-b is a base station.

At 425, wireless device 205-a may encode the data for the set of data resource elements according to the scrambling sequence. In some examples, a PAPR for the data from each of the one or more symbol periods encoded according to the first scrambling sequence may satisfy a threshold value or may be a minimum value for the PAPR among a set of PAPRs. In some examples, wireless device 205-a may autonomously determine the threshold value, may be pre-configured with the threshold value, may receive control signaling indicating the threshold value, or the like.

At 430, wireless device 205-a may transmit the set of data resource elements with the set of pilot resource elements to wireless device 205-b in the one or more symbol periods 435.

At 440, wireless device 205-b may identify the scrambling sequence used by wireless device 205-a to scramble the data. For example, wireless device 205-b may identify the scrambling sequence based on the scrambling sequence indication 420 or based on blindly estimating the scrambling sequence.

That is, at 445, wireless device 205-b may perform a measurement of a channel for the set of data resource elements or based on one or more pilot resources (e.g., if wireless device 205-a applies the same scrambling sequences to the pilot resources) and may blindly estimate the scrambling sequence based on the measurement of the channel. In some examples, performing the channel measurement for the pilot resources may enable wireless device 205-b to better estimate the scrambling sequence. Wireless device 205-b may identify incorrect scrambling sequences based on if there is a relatively large, or non-realistic, delay spread estimation or a relatively low frequency coherency.

At 450, wireless device 205-b may decode the data of the set of data resource elements according to the identified scrambling sequence.

Figure 5:
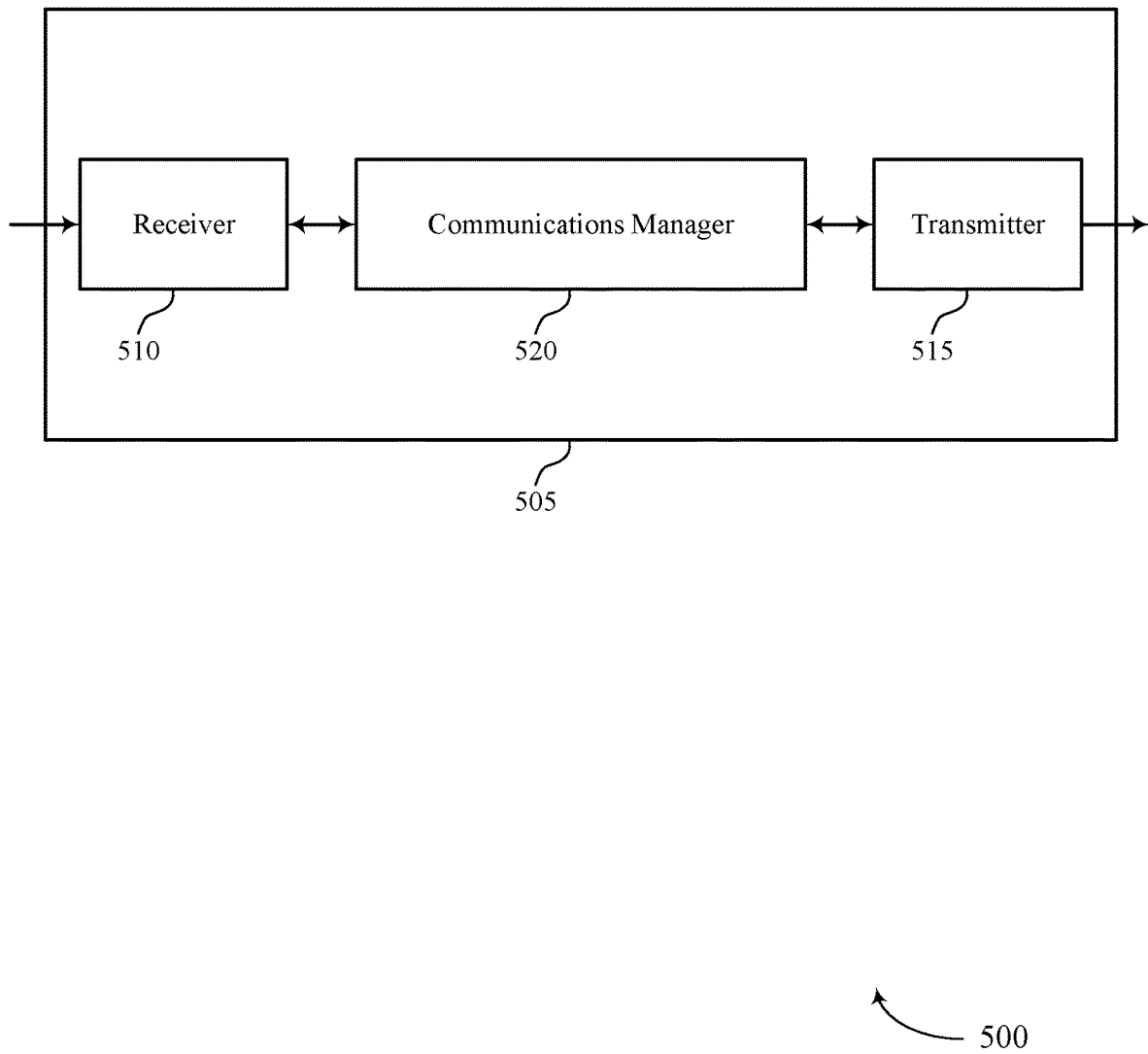
FIGS. 5 and 6 show block diagrams of devices that support control of scrambling sequence per symbol for DPoD in accordance with aspects of the present disclosure.

FIG. 5 shows a block diagram 500 of a device 505 that supports control of scrambling sequence per symbol for DPoD in accordance with aspects of the present disclosure. The device 505 may be an example of aspects of a wireless device as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to control of scrambling sequence per symbol for DPoD). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to control of scrambling sequence per symbol for DPoD). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of control of scrambling sequence per symbol for DPoD as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signaling processor (DSP), an ASIC, a field-programmable gate-array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first wireless device in accordance with examples as disclosed herein. For example, the communications manager 520 may be configured as or otherwise support a means for selecting a first scrambling sequence from a set of candidate scrambling sequences based on a value of a non-linearity parameter for a set of data resource elements for transmitting data in one or more symbol periods and a set of pilot resource elements for transmitting DMRSs associated with the data in the one or more symbol periods. The communications manager 520 may be configured as or otherwise support a means for encoding the data for the set of data resource elements according to the first scrambling sequence. The communications manager 520 may be configured as or otherwise support a means for transmitting, in the one or more symbol periods, the set of data resource elements with the set of pilot resource elements.

Additionally or alternatively, the communications manager 520 may support wireless communications at a second wireless device in accordance with examples as disclosed herein. For example, the communications manager 520 may be configured as or otherwise support a means for receiving, from a first wireless device, a set of data resource elements in one or more symbol periods, the set of data resource elements including data and a set of pilot resource elements including DMRSs associated with the data in the one or more symbol periods. The communications manager 520 may be configured as or otherwise support a means for identifying, from a set of candidate scrambling sequences, a first scrambling sequence used by the first wireless device to scramble the data. The communications manager 520 may be configured as or otherwise support a means for decoding the data of the set of data resource elements according to the first scrambling sequence.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for selecting a scrambling sequence, which may reduce processing, reduce power consumption, result in more efficient utilization of communication resources, or the like.

Figure 6:
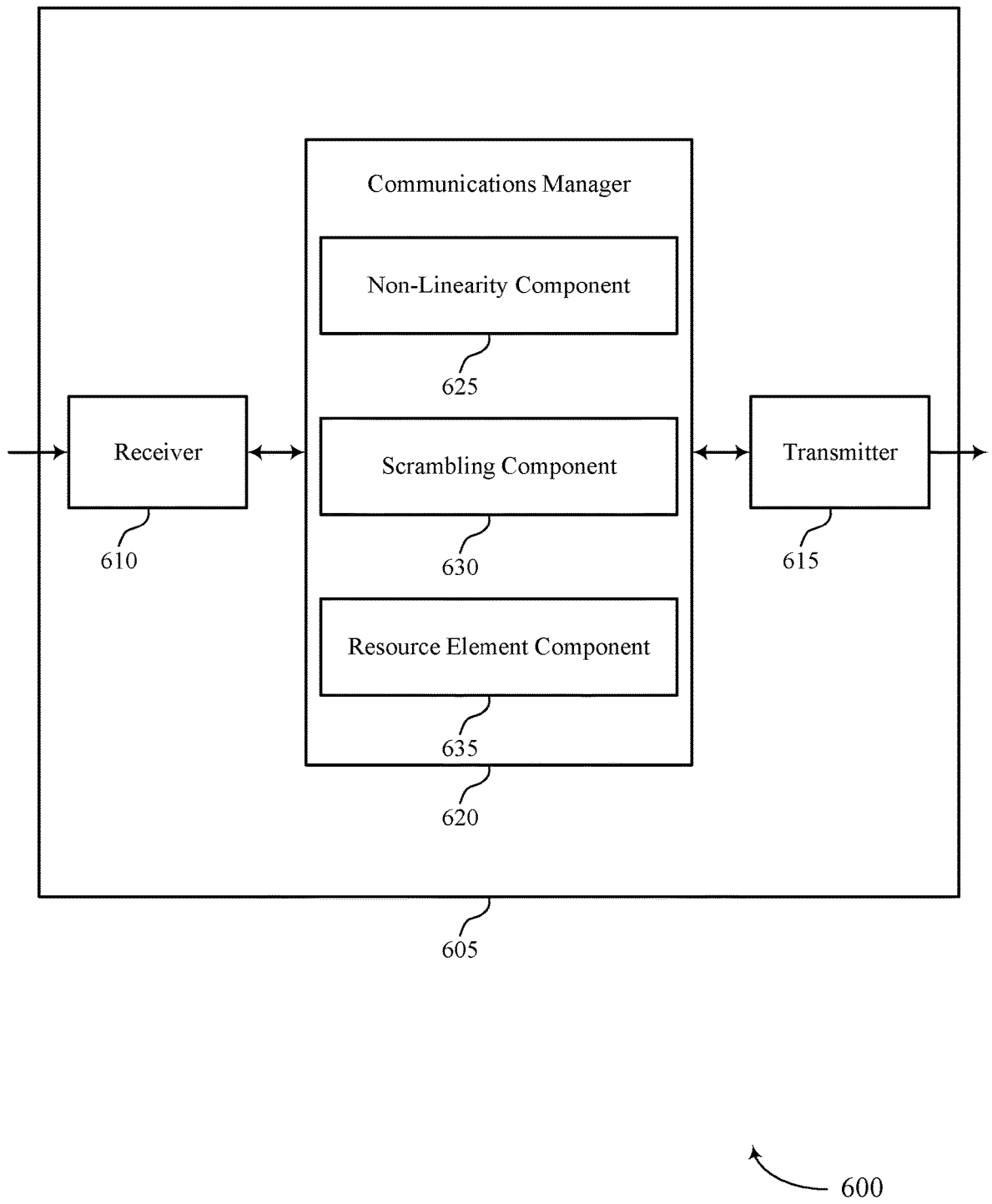

FIG. 6 shows a block diagram 600 of a device 605 that supports control of scrambling sequence per symbol for DPoD in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to control of scrambling sequence per symbol for DPoD). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to control of scrambling sequence per symbol for DPoD). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of control of scrambling sequence per symbol for DPoD as described herein. For example, the communications manager 620 may include a non-linearity component 625, a scrambling component 630, a resource element component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. The non-linearity component 625 may be configured as or otherwise support a means for selecting a first scrambling sequence from a set of candidate scrambling sequences based on a value of a non-linearity parameter for a set of data resource elements for transmitting data in one or more symbol periods and a set of pilot resource elements for transmitting DMRSs associated with the data in the one or more symbol periods. The scrambling component 630 may be configured as or otherwise support a means for encoding the data for the set of data resource elements according to the first scrambling sequence. The resource element component 635 may be configured as or otherwise support a means for transmitting, in the one or more symbol periods, the set of data resource elements with the set of pilot resource elements.

Additionally or alternatively, the communications manager 620 may support wireless communications at a second wireless device in accordance with examples as disclosed herein. The resource element component 635 may be configured as or otherwise support a means for receiving, from a first wireless device, a set of data resource elements in one or more symbol periods, the set of data resource elements including data and a set of pilot resource elements including DMRSs associated with the data in the one or more symbol periods. The scrambling component 630 may be configured as or otherwise support a means for identifying, from a set of candidate scrambling sequences, a first scrambling sequence used by the first wireless device to scramble the data. The resource element component 635 may be configured as or otherwise support a means for decoding the data of the set of data resource elements according to the first scrambling sequence.

Figure 7:
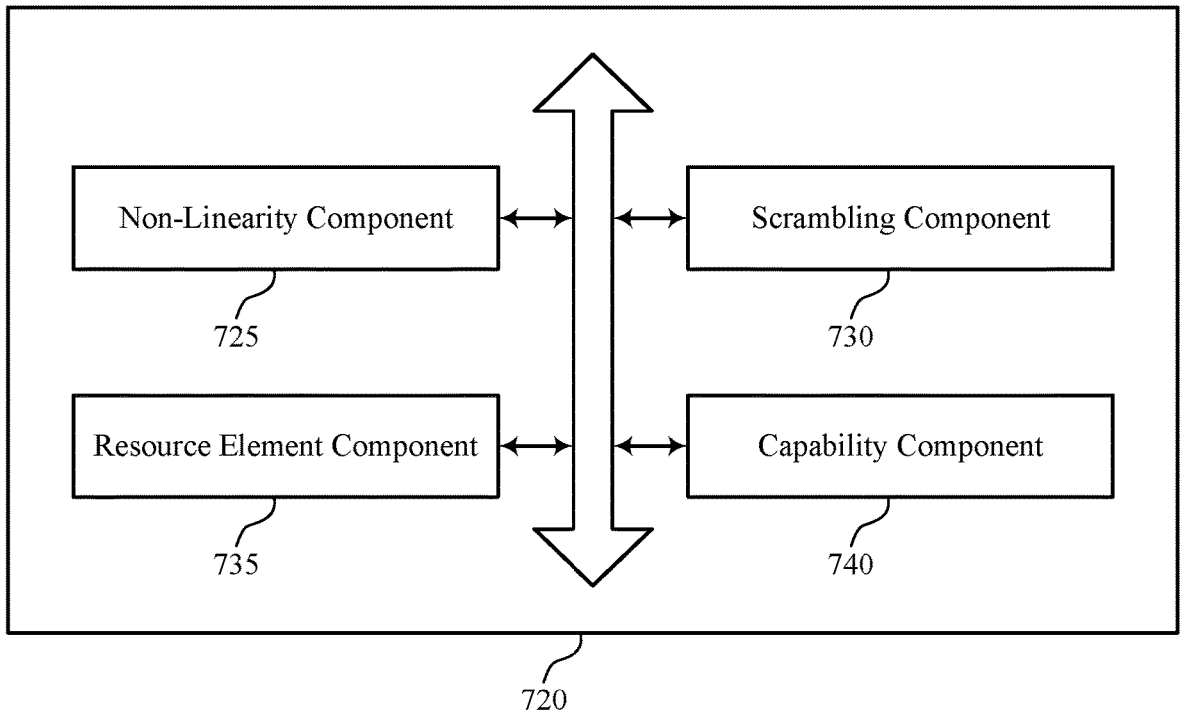
FIG. 7 shows a block diagram of a communications manager that supports control of scrambling sequence per symbol for DPoD in accordance with aspects of the present disclosure.

FIG. 7 shows a block diagram 700 of a communications manager 720 that supports control of scrambling sequence per symbol for DPoD in accordance with aspects of the present disclosure. The communications manager 720 may be an example of aspects of a communications manager 520, a communications manager 620, or both, as described herein. The communications manager 720, or various components thereof, may be an example of means for performing various aspects of control of scrambling sequence per symbol for DPoD as described herein. For example, the communications manager 720 may include a non-linearity component 725, a scrambling component 730, a resource element component 735, a capability component 740, or any combination thereof. Each of these components may communicate, directly or indirectly, with one another (e.g., via one or more buses).

The communications manager 720 may support wireless communications at a first wireless device in accordance with examples as disclosed herein. The non-linearity component 725 may be configured as or otherwise support a means for selecting a first scrambling sequence from a set of candidate scrambling sequences based on a value of a non-linearity parameter for a set of data resource elements for transmitting data in one or more symbol periods and a set of pilot resource elements for transmitting DMRSs associated with the data in the one or more symbol periods. The scrambling component 730 may be configured as or otherwise support a means for encoding the data for the set of data resource elements according to the first scrambling sequence. The resource element component 735 may be configured as or otherwise support a means for transmitting, in the one or more symbol periods, the set of data resource elements with the set of pilot resource elements.

In some examples, the scrambling component 730 may be configured as or otherwise support a means for transmitting, to a second wireless device, control signaling indicating the first scrambling sequence.

In some examples, to support transmitting the control signaling, the scrambling component 730 may be configured as or otherwise support a means for transmitting a DCI message including one or more bits indicating the first scrambling sequence, where the second wireless device is a UE.

In some examples, to support transmitting the control signaling, the scrambling component 730 may be configured as or otherwise support a means for transmitting an UCI message including one or more bits indicating the first scrambling sequence, where the second wireless device is a base station.

In some examples, the capability component 740 may be configured as or otherwise support a means for receiving, from a second wireless device, an indication of a capability of the second wireless device to blindly estimate the first scrambling sequence, where selecting the first scrambling sequence from the set of candidate scrambling sequences is based on the received indication.

In some examples, the non-linearity component 725 may be configured as or otherwise support a means for performing, for each set of one or more symbol periods, an estimation procedure to evaluate the non-linearity parameter corresponding to each scrambling sequence from the set of candidate scrambling sequences for the one or more symbol periods. In some examples, the scrambling component 730 may be configured as or otherwise support a means for identifying the first scrambling sequence based on performing the estimation procedure.

In some examples, to support performing the estimation procedure, the scrambling component 730 may be configured as or otherwise support a means for determining, for each set of one or more symbol periods, a PAPR corresponding to the each scrambling sequence from the set of candidate scrambling sequences. In some examples, to support performing the estimation procedure, the scrambling component 730 may be configured as or otherwise support a means for selecting the first scrambling sequence based on comparing the calculated PAPR corresponding to the each scrambling sequence from the set of candidate scrambling sequences.

In some examples, a first PAPR of the first scrambling sequence is a lowest value of each of the calculated peak-to-average power ratios corresponding to the each scrambling sequence.

In some examples, selecting the first scrambling sequence from the set of candidate scrambling sequences is performed once per group of symbol periods, where the group of symbols periods makes up a slot. In some examples, the one or more symbols periods include one symbol period.

In some examples, a PAPR for the data from each of the one or more symbol periods encoded according to the first scrambling sequence satisfies a threshold value or is a minimum value for the PAPR among a set of PAPRs.

In some examples, selecting the first scrambling sequence is based on a modulation order of the set of data resource elements having a number of points that satisfies a threshold number of points (e.g., a QAM of at least 1024 QAM).

Additionally or alternatively, the communications manager 720 may support wireless communications at a second wireless device in accordance with examples as disclosed herein. In some examples, the resource element component 735 may be configured as or otherwise support a means for receiving, from a first wireless device, a set of data resource elements in one or more symbol periods, the set of data resource elements including data and a set of pilot resource elements including DMRSs associated with the data in the one or more symbol periods. In some examples, the scrambling component 730 may be configured as or otherwise support a means for identifying, from a set of candidate scrambling sequences, a first scrambling sequence used by the first wireless device to scramble the data. In some examples, the resource element component 735 may be configured as or otherwise support a means for decoding the data of the set of data resource elements according to the first scrambling sequence.

In some examples, to support identifying the first scrambling sequence, the scrambling component 730 may be configured as or otherwise support a means for receiving, from the first wireless device, control signaling indicating the first scrambling sequence.

In some examples, to support receiving the control signaling, the scrambling component 730 may be configured as or otherwise support a means for receiving a DCI message including one or more bits indicating the first scrambling sequence, where the first wireless device is a base station.

In some examples, to support receiving the control signaling, the scrambling component 730 may be configured as or otherwise support a means for receiving an UCI message including one or more bits indicating the first scrambling sequence, where the first wireless device is a UE.

In some examples, the resource element component 735 may be configured as or otherwise support a means for performing a measurement of a channel corresponding to the set of data resource elements. In some examples, the scrambling component 730 may be configured as or otherwise support a means for estimating the first scrambling sequence based on the measurement of the channel.

In some examples, the capability component 740 may be configured as or otherwise support a means for transmitting, to the first wireless device, an indication of a capability of the second wireless device to blindly estimate the first scrambling sequence, where estimating the first scrambling sequence is based on the capability.

In some examples, the first scrambling sequence is used to decode the data for one symbol period. In some examples, the identifying of scrambling sequences is performed once per symbol period.

In some examples, the first scrambling sequence is used to decode the data for one slot. In some examples, the identifying of scrambling sequences is performed once per slot.

In some examples, a PAPR for the data from each of the one or more symbol periods satisfies a threshold value or is a minimum value for the PAPR among a set of PAPRs.

In some examples, identifying the first scrambling sequence is based on a modulation order of the set of data resource elements having a number of points that satisfies a threshold number of points (e.g., a QAM of at least 1024 QAM).

Figure 8:
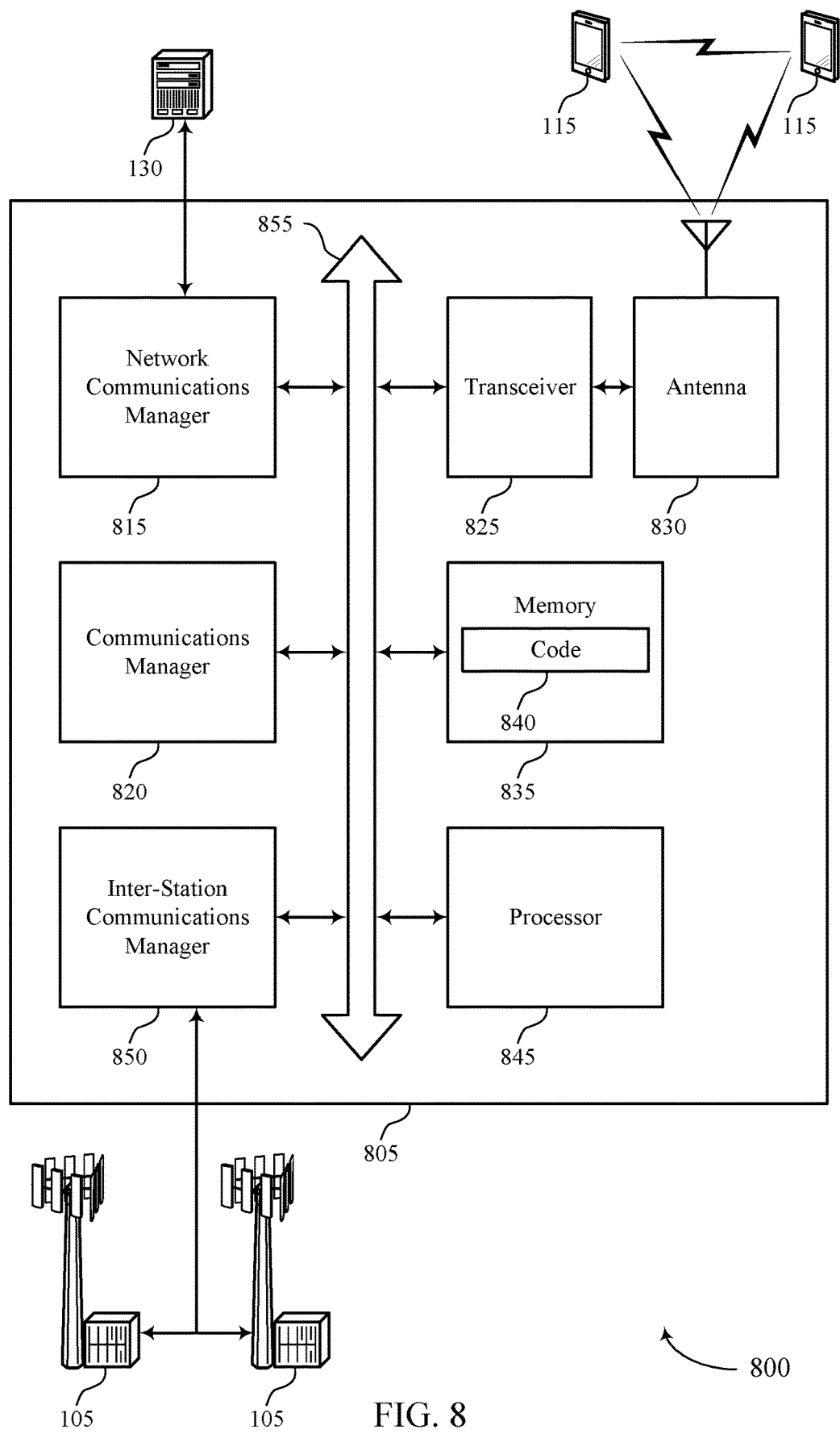
FIG. 8 shows a diagram of a system including a device that supports control of scrambling sequence per symbol for DPoD in accordance with aspects of the present disclosure.

FIG. 8 shows a diagram of a system 800 including a device 805 that supports control of scrambling sequence per symbol for DPoD in accordance with aspects of the present disclosure. The device 805 may be an example of or include the components of a device 505, a device 605, or a wireless device as described herein. The device 805 may include components for bi-directional voice and data communications including components for transmitting and receiving communications, such as a communications manager 820, an I/O controller 810, a network communications manager 815, a transceiver 825, an antenna 830, a memory 835, code 840, a processor 845, and an inter-station communications manager 850. These components may be in electronic communication or otherwise coupled (e.g., operatively, communicatively, functionally, electronically, electrically) via one or more buses (e.g., a bus 855).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 845. In some cases, a user may interact with the device 805 via the I/O controller 810 or via hardware components controlled by the I/O controller 810.

The network communications manager 815 may manage communications with a core network 130 (e.g., via one or more wired backhaul links). For example, the network communications manager 815 may manage the transfer of data communications for client devices, such as one or more UEs 115.

In some cases, the device 805 may include a single antenna 830. However, in some other cases the device 805 may have more than one antenna 830, which may be capable of concurrently transmitting or receiving multiple wireless transmissions. The transceiver 825 may communicate bi-directionally, via the one or more antennas 830, wired, or wireless links as described herein. For example, the transceiver 825 may represent a wireless transceiver and may communicate bi-directionally with another wireless transceiver. The transceiver 825 may also include a modem to modulate the packets, to provide the modulated packets to one or more antennas 830 for transmission, and to demodulate packets received from the one or more antennas 830. The transceiver 825, or the transceiver 825 and one or more antennas 830, may be an example of a transmitter 515, a transmitter 615, a receiver 510, a receiver 610, or any combination thereof or component thereof, as described herein.

The memory 835 may include random-access memory (RAM) and read-only memory (ROM). The memory 835 may store computer-readable, computer-executable code 840 including instructions that, when executed by the processor 845, cause the device 805 to perform various functions described herein. The code 840 may be stored in a non-transitory computer-readable medium such as system memory or another type of memory. In some cases, the code 840 may not be directly executable by the processor 845 but may cause a computer (e.g., when compiled and executed) to perform functions described herein. In some cases, the memory 835 may contain, among other things, a basic I/O system (BIOS) which may control basic hardware or software operation such as the interaction with peripheral components or devices.

The processor 845 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 845 may be configured to operate a memory array using a memory controller. In some other cases, a memory controller may be integrated into the processor 845. The processor 845 may be configured to execute computer-readable instructions stored in a memory (e.g., the memory 835) to cause the device 805 to perform various functions (e.g., functions or tasks supporting control of scrambling sequence per symbol for DPoD). For example, the device 805 or a component of the device 805 may include a processor 845 and memory 835 coupled to the processor 845, the processor 845 and memory 835 configured to perform various functions described herein.

The inter-station communications manager 850 may manage communications with other base stations 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, the inter-station communications manager 850 may provide an X2 interface within an LTE/LTE-A wireless communications network technology to provide communication between base stations 105.

The communications manager 820 may support wireless communications at a first wireless device in accordance with examples as disclosed herein. For example, the communications manager 820 may be configured as or otherwise support a means for selecting a first scrambling sequence from a set of candidate scrambling sequences based on a value of a non-linearity parameter for a set of data resource elements for transmitting data in one or more symbol periods and a set of pilot resource elements for transmitting DMRSs associated with the data in the one or more symbol periods. The communications manager 820 may be configured as or otherwise support a means for encoding the data for the set of data resource elements according to the first scrambling sequence. The communications manager 820 may be configured as or otherwise support a means for transmitting, in the one or more symbol periods, the set of data resource elements with the set of pilot resource elements.

Additionally or alternatively, the communications manager 820 may support wireless communications at a second wireless device in accordance with examples as disclosed herein. For example, the communications manager 820 may be configured as or otherwise support a means for receiving, from a first wireless device, a set of data resource elements in one or more symbol periods, the set of data resource elements including data and a set of pilot resource elements including DMRSs associated with the data in the one or more symbol periods. The communications manager 820 may be configured as or otherwise support a means for identifying, from a set of candidate scrambling sequences, a first scrambling sequence used by the first wireless device to scramble the data. The communications manager 820 may be configured as or otherwise support a means for decoding the data of the set of data resource elements according to the first scrambling sequence.

By including or configuring the communications manager 820 in accordance with examples as described herein, the device 805 may support techniques for may support techniques for selecting a scrambling sequence, which may improve communication reliability, reduce latency, improve user experience related to reduced processing, reduce power consumption, result in more efficient utilization of communication resources, improve coordination between devices, result in longer battery life, improve utilization of processing capability, and the like.

In some examples, the communications manager 820 may be configured to perform various operations (e.g., receiving, monitoring, transmitting) using or otherwise in cooperation with the transceiver 825, the one or more antennas 830, or any combination thereof. Although the communications manager 820 is illustrated as a separate component, in some examples, one or more functions described with reference to the communications manager 820 may be supported by or performed by the processor 845, the memory 835, the code 840, or any combination thereof. For example, the code 840 may include instructions executable by the processor 845 to cause the device 805 to perform various aspects of control of scrambling sequence per symbol for DPoD as described herein, or the processor 845 and the memory 835 may be otherwise configured to perform or support such operations.

Figure 9:
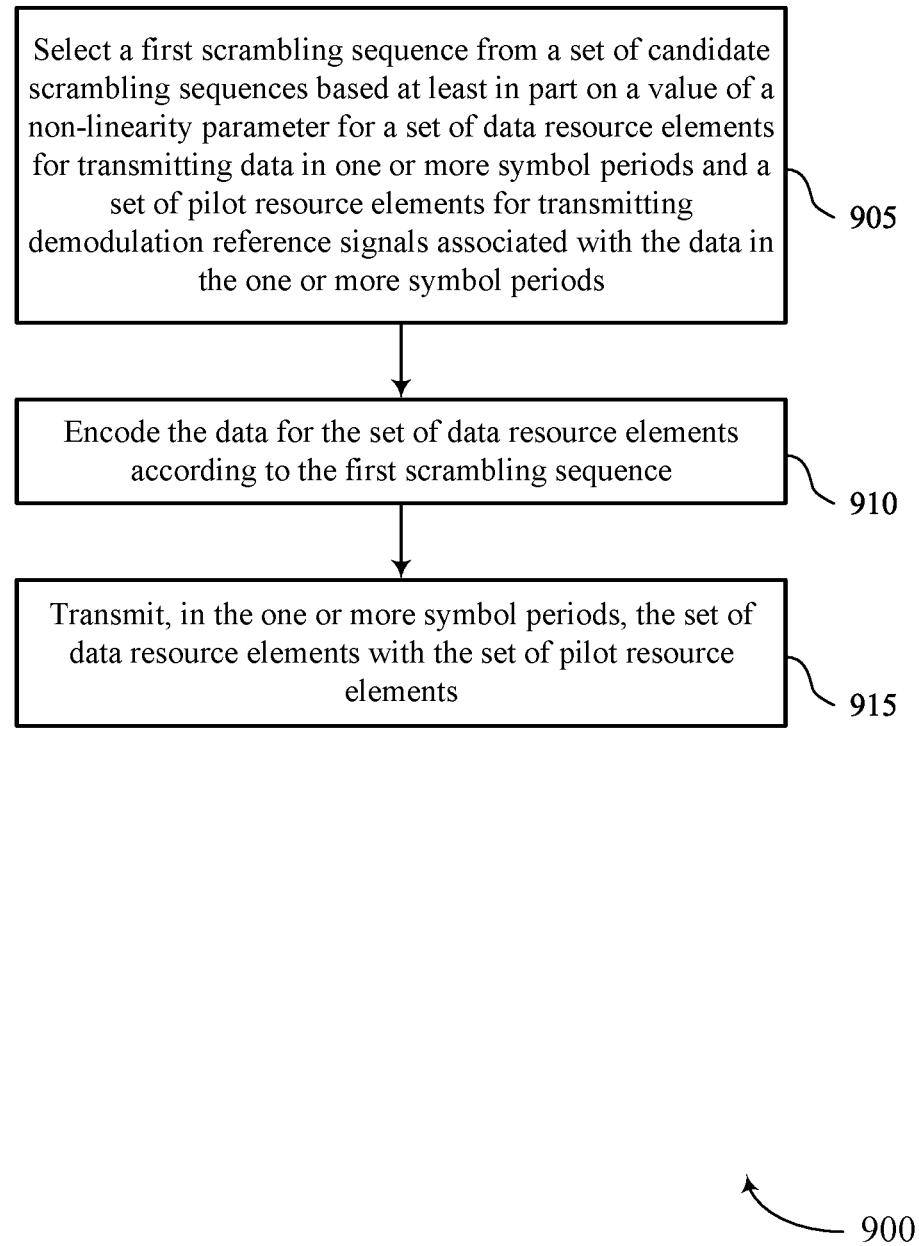
FIGS. 9 through 12 show flowcharts illustrating methods that support control of scrambling sequence per symbol for DPoD in accordance with aspects of the present disclosure.

FIG. 9 shows a flowchart illustrating a method 900 that supports control of scrambling sequence per symbol for DPoD in accordance with aspects of the present disclosure. The operations of the method 900 may be implemented by a wireless device or its components as described herein. For example, the operations of the method 900 may be performed by a wireless device as described with reference to FIGS. 1 through 8. In some examples, a wireless device may execute a set of instructions to control the functional elements of the wireless device to perform the described functions. Additionally or alternatively, the wireless device may perform aspects of the described functions using special-purpose hardware.

At 905, the method may include selecting a first scrambling sequence from a set of candidate scrambling sequences based on a value of a non-linearity parameter for a set of data resource elements for transmitting data in one or more symbol periods and a set of pilot resource elements for transmitting DMRSs associated with the data in the one or more symbol periods. The operations of 905 may be performed in accordance with examples as disclosed herein. In some examples, aspects of the operations of 905 may be performed by a non-linearity component 725 as described with reference to FIG. 7.

At 910, the method may include encoding the data for the set of data resource elements according to the first scrambling sequence. The operations of 910 may be performed in accordance with examples as disclosed herein. In some examples, aspects of the operations of 910 may be performed by a scrambling component 730 as described with reference to FIG. 7.

At 915, the method may include transmitting, in the one or more symbol periods, the set of data resource elements with the set of pilot resource elements. The operations of 915 may be performed in accordance with examples as disclosed herein. In some examples, aspects of the operations of 915 may be performed by a resource element component 735 as described with reference to FIG. 7.

Figure 10:
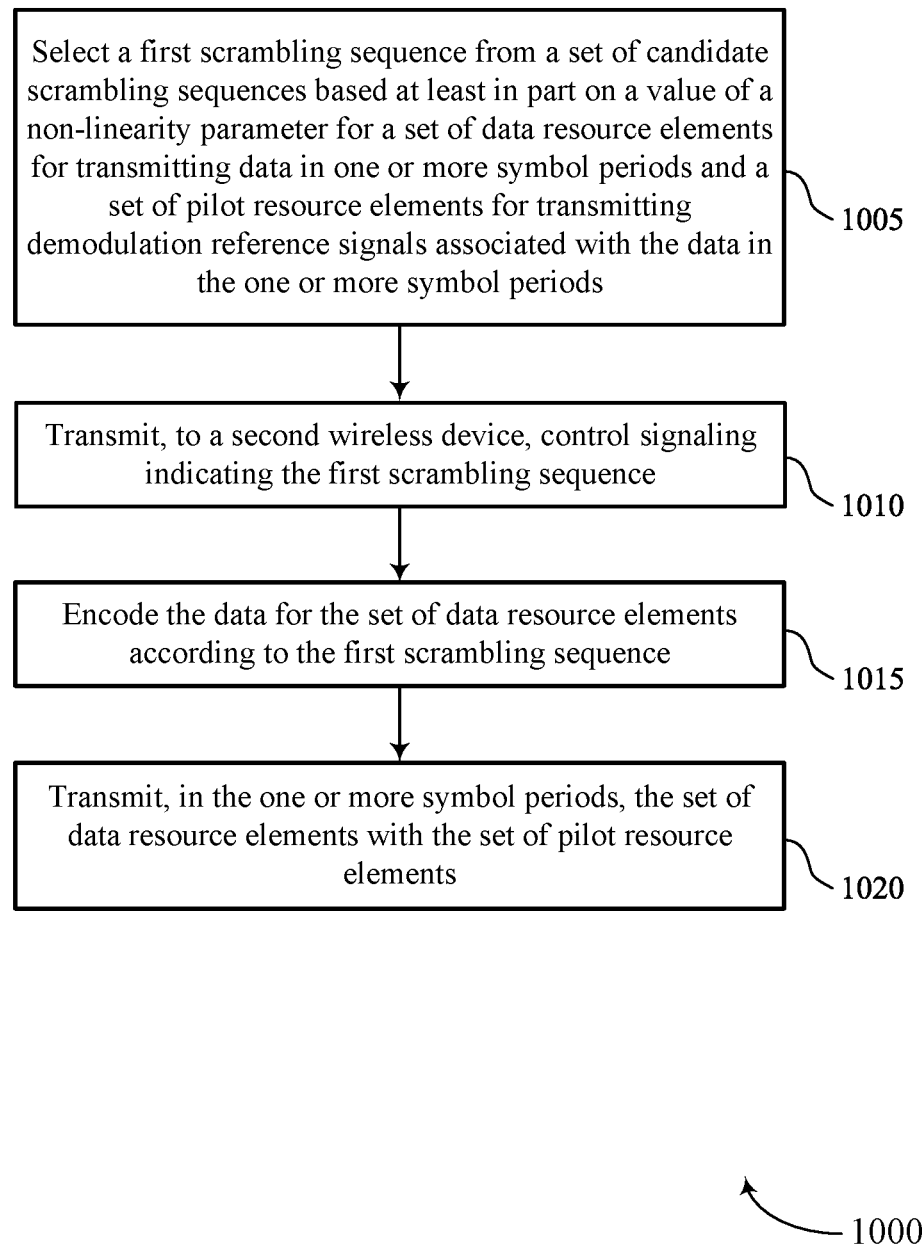

FIG. 10 shows a flowchart illustrating a method 1000 that supports control of scrambling sequence per symbol for DPoD in accordance with aspects of the present disclosure. The operations of the method 1000 may be implemented by a wireless device or its components as described herein. For example, the operations of the method 1000 may be performed by a wireless device as described with reference to FIGS. 1 through 8. In some examples, a wireless device may execute a set of instructions to control the functional elements of the wireless device to perform the described functions. Additionally or alternatively, the wireless device may perform aspects of the described functions using special-purpose hardware.

At 1005, the method may include selecting a first scrambling sequence from a set of candidate scrambling sequences based on a value of a non-linearity parameter for a set of data resource elements for transmitting data in one or more symbol periods and a set of pilot resource elements for transmitting DMRSs associated with the data in the one or more symbol periods. The operations of 1005 may be performed in accordance with examples as disclosed herein. In some examples, aspects of the operations of 1005 may be performed by a non-linearity component 725 as described with reference to FIG. 7.

At 1010, the method may include transmitting, to a second wireless device, control signaling indicating the first scrambling sequence. The operations of 1010 may be performed in accordance with examples as disclosed herein. In some examples, aspects of the operations of 1010 may be performed by a scrambling component 730 as described with reference to FIG. 7.

At 1015, the method may include encoding the data for the set of data resource elements according to the first scrambling sequence. The operations of 1015 may be performed in accordance with examples as disclosed herein. In some examples, aspects of the operations of 1010 may be performed by a scrambling component 730 as described with reference to FIG. 7.

At 1020, the method may include transmitting, in the one or more symbol periods, the set of data resource elements with the set of pilot resource elements. The operations of 915 may be performed in accordance with examples as disclosed herein. In some examples, aspects of the operations of 1020 may be performed by a resource element component 735 as described with reference to FIG. 7.

Figure 11:
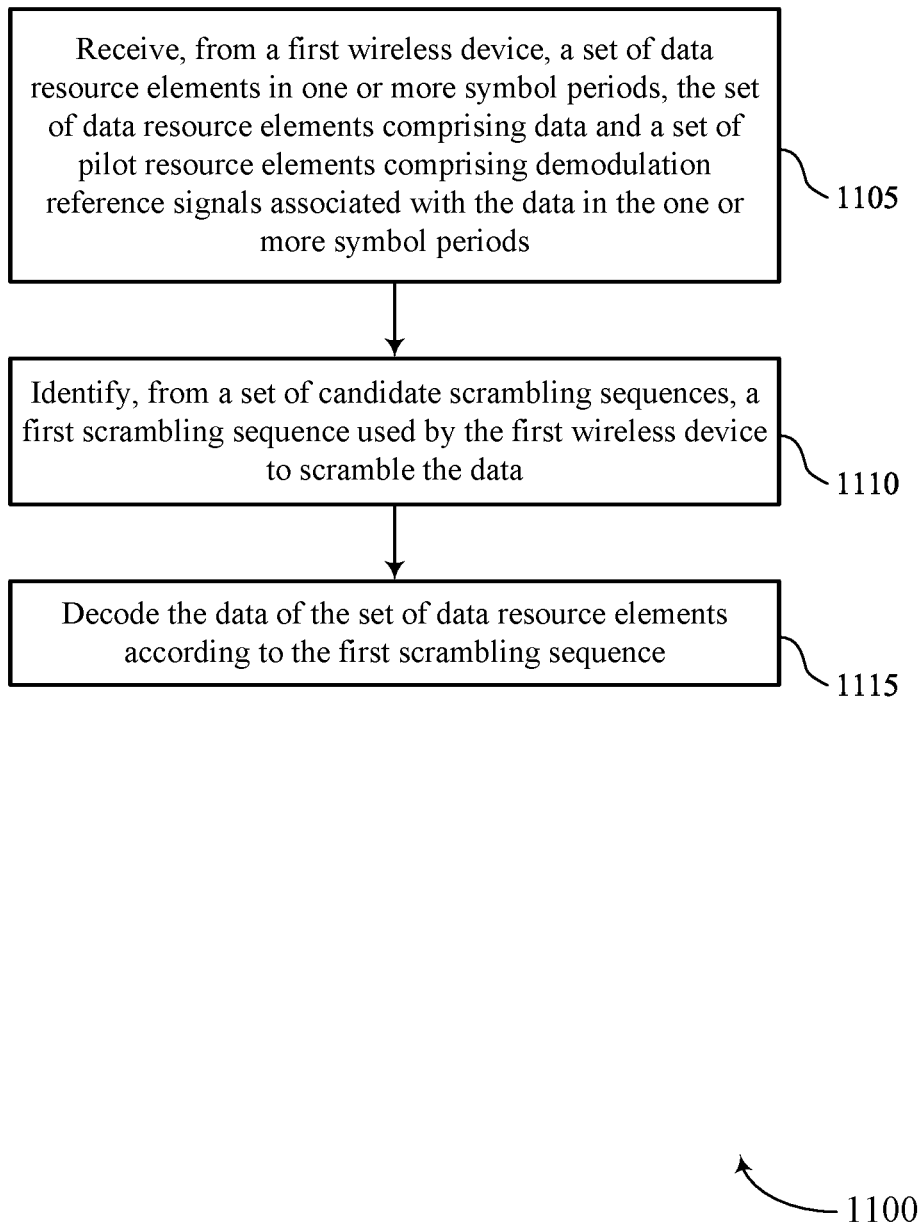

FIG. 11 shows a flowchart illustrating a method 1100 that supports control of scrambling sequence per symbol for DPoD in accordance with aspects of the present disclosure. The operations of the method 1100 may be implemented by a wireless device or its components as described herein. For example, the operations of the method 1100 may be performed by a wireless device as described with reference to FIGS. 1 through 8. In some examples, a wireless device may execute a set of instructions to control the functional elements of the wireless device to perform the described functions. Additionally or alternatively, the wireless device may perform aspects of the described functions using special-purpose hardware.

At 1105, the method may include receiving, from a first wireless device, a set of data resource elements in one or more symbol periods, the set of data resource elements including data and a set of pilot resource elements including DMRSs associated with the data in the one or more symbol periods. The operations of 1105 may be performed in accordance with examples as disclosed herein. In some examples, aspects of the operations of 1105 may be performed by a resource element component 735 as described with reference to FIG. 7.

At 1110, the method may include identifying, from a set of candidate scrambling sequences, a first scrambling sequence used by the first wireless device to scramble the data. The operations of 1110 may be performed in accordance with examples as disclosed herein. In some examples, aspects of the operations of 1110 may be performed by a scrambling component 730 as described with reference to FIG. 7.

At 1115, the method may include decoding the data of the set of data resource elements according to the first scrambling sequence. The operations of 1115 may be performed in accordance with examples as disclosed herein. In some examples, aspects of the operations of 1115 may be performed by a resource element component 735 as described with reference to FIG. 7.

Figure 12:
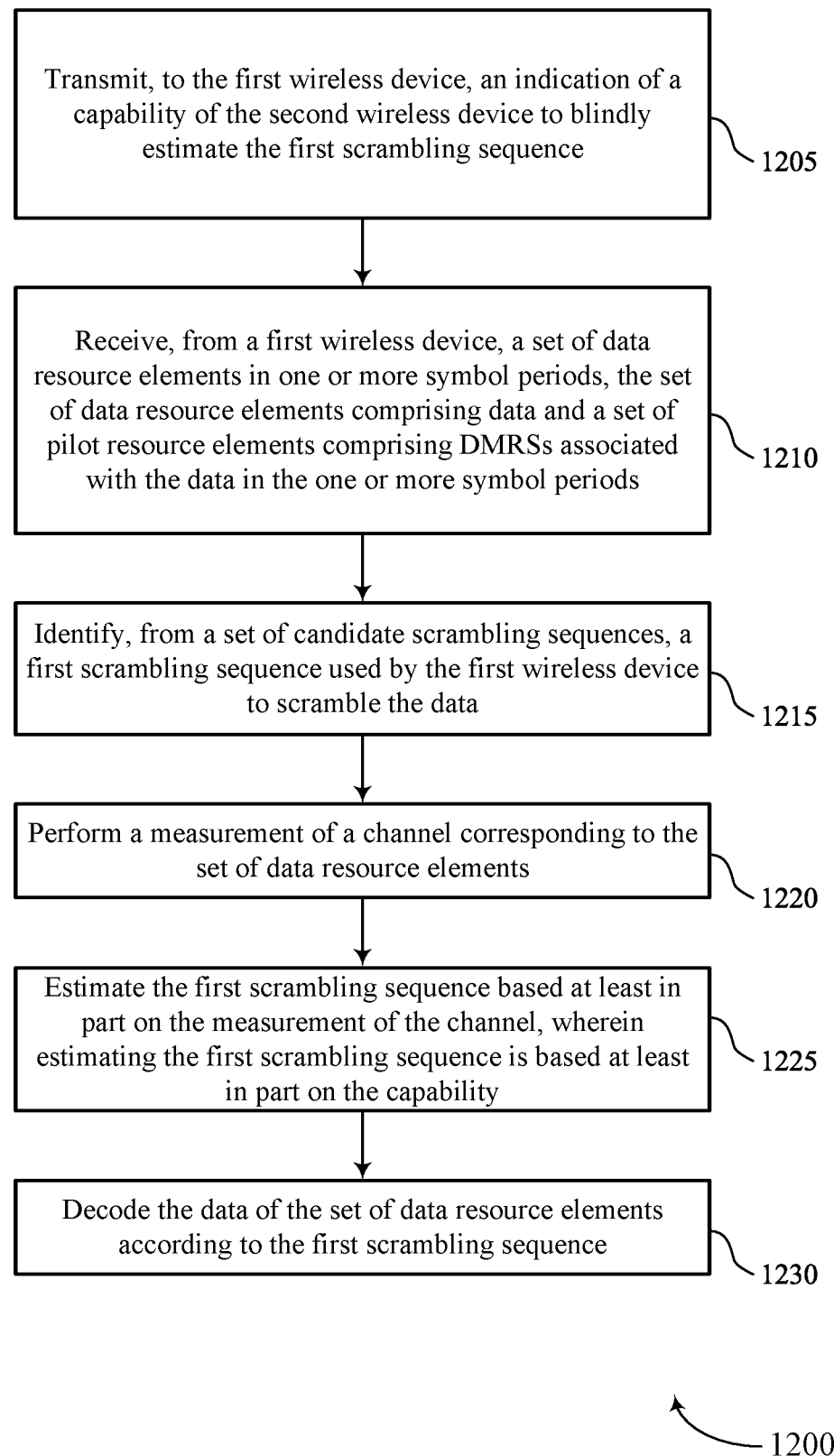

FIG. 12 shows a flowchart illustrating a method 1200 that supports control of scrambling sequence per symbol for DPoD in accordance with aspects of the present disclosure. The operations of the method 1200 may be implemented by a wireless device or its components as described herein. For example, the operations of the method 1200 may be performed by a wireless device as described with reference to FIGS. 1 through 8. In some examples, a wireless device may execute a set of instructions to control the functional elements of the wireless device to perform the described functions. Additionally or alternatively, the wireless device may perform aspects of the described functions using special-purpose hardware.

At 1205, the method may include transmitting, to the first wireless device, an indication of a capability of the second wireless device to blindly estimate the first scrambling sequence. The operations of 1205 may be performed in accordance with examples as disclosed herein. In some examples, aspects of the operations of 1205 may be performed by a capability component 740 as described with reference to FIG. 7.

At 1210, the method may include receiving, from a first wireless device, a set of data resource elements in one or more symbol periods, the set of data resource elements including data and a set of pilot resource elements including DMRSs associated with the data in the one or more symbol periods. The operations of 1210 may be performed in accordance with examples as disclosed herein. In some examples, aspects of the operations of 1210 may be performed by a resource element component 735 as described with reference to FIG. 7.

At 1215, the method may include identifying, from a set of candidate scrambling sequences, a first scrambling sequence used by the first wireless device to scramble the data. The operations of 1215 may be performed in accordance with examples as disclosed herein. In some examples, aspects of the operations of 1215 may be performed by a scrambling component 730 as described with reference to FIG. 7.

At 1220, the method may include performing a measurement of a channel corresponding to the set of data resource elements. The operations of 1220 may be performed in accordance with examples as disclosed herein. In some examples, aspects of the operations of 1220 may be performed by a resource element component 735 as described with reference to FIG. 7.

At 1225, the method may include estimating the first scrambling sequence based on the measurement of the channel, where estimating the first scrambling sequence is based on the capability. The operations of 1225 may be performed in accordance with examples as disclosed herein. In some examples, aspects of the operations of 1225 may be performed by a scrambling component 730 as described with reference to FIG. 7.

At 1230, the method may include decoding the data of the set of data resource elements according to the first scrambling sequence. The operations of 1230 may be performed in accordance with examples as disclosed herein. In some examples, aspects of the operations of 1230 may be performed by a resource element component 735 as described with reference to FIG. 7.

The following provides an overview of aspects of the present disclosure:

Aspect 1: A method for wireless communications at a first wireless device, comprising: selecting a first scrambling sequence from a set of candidate scrambling sequences based at least in part on a value of a non-linearity parameter for a set of data resource elements for transmitting data in one or more symbol periods and a set of pilot resource elements for transmitting demodulation reference signals associated with the data in the one or more symbol periods; encoding the data for the set of data resource elements according to the first scrambling sequence; and transmitting, in the one or more symbol periods, the set of data resource elements with the set of pilot resource elements.

Aspect 2: The method of aspect 1, further comprising: transmitting, to a second wireless device, control signaling indicating the first scrambling sequence.

Aspect 3: The method of aspect 2, wherein transmitting the control signaling comprises: transmitting a downlink control information message comprising one or more bits indicating the first scrambling sequence, wherein the second wireless device is a UE.

Aspect 4: The method of aspect 2, wherein transmitting the control signaling comprises: transmitting an uplink control information message comprising one or more bits indicating the first scrambling sequence, wherein the second wireless device is a base station.

Aspect 5: The method of any of aspects 1 through 4, further comprising: receiving, from a second wireless device, an indication of a capability of the second wireless device to blindly estimate the first scrambling sequence, wherein selecting the first scrambling sequence from the set of candidate scrambling sequences is based at least in part on the received indication.

Aspect 6: The method of any of aspects 1 through 5, further comprising: performing, for each set of one or more symbol periods, an estimation procedure to evaluate the non-linearity parameter corresponding to each scrambling sequence from the set of candidate scrambling sequences for the one or more symbol periods; and identifying the first scrambling sequence based at least in part on performing the estimation procedure.

Aspect 7: The method of aspect 6, wherein performing the estimation procedure comprises: determining, for each set of one or more symbol periods, a peak-to-average-power ratio corresponding to the each scrambling sequence from the set of candidate scrambling sequences; and selecting the first scrambling sequence based at least in part on comparing the calculated peak-to-average-power ratio corresponding to the each scrambling sequence from the set of candidate scrambling sequences.

Aspect 8: The method of aspect 7, wherein a first peak-to-average-power ratio of the first scrambling sequence is a lowest value of each of the calculated peak-to-average power ratios corresponding to the each scrambling sequence.

Aspect 9: The method of any of aspects 1 through 8, wherein selecting the first scrambling sequence from the set of candidate scrambling sequences is performed once per group of symbol periods.

Aspect 10: The method of aspect 9, wherein the group of symbol periods comprises one slot.

Aspect 11: The method of any of aspects 1 through 10, wherein a peak-to-average-power ratio for the data from each of the one or more symbol periods encoded according to the first scrambling sequence satisfies a threshold value or is a minimum value for the peak-to-average-power ratio among a set of peak-to-average-power ratios.

Aspect 12: The method of any of aspects 1 through 11, wherein selecting the first scrambling sequence is based at least in part on a modulation order of the set of data resource elements having a number of points that satisfies a threshold number of points.

Aspect 13: A method for wireless communications at a second wireless device, comprising: receiving, from a first wireless device, a set of data resource elements in one or more symbol periods, the set of data resource elements comprising data and a set of pilot resource elements comprising demodulation reference signals associated with the data in the one or more symbol periods; identifying, from a set of candidate scrambling sequences, a first scrambling sequence used by the first wireless device to scramble the data; and decoding the data of the set of data resource elements according to the first scrambling sequence.

Aspect 14: The method of aspect 13, wherein identifying the first scrambling sequence comprises: receiving, from the first wireless device, control signaling indicating the first scrambling sequence.

Aspect 15: The method of aspect 14, wherein receiving the control signaling comprises: receiving a downlink control information message comprising one or more bits indicating the first scrambling sequence, wherein the first wireless device is a base station.

Aspect 16: The method of aspect 14, wherein receiving the control signaling comprises: receiving an uplink control information message comprising one or more bits indicating the first scrambling sequence, wherein the first wireless device is a UE.

Aspect 17: The method of any of aspects 13 through 16, further comprising: performing a measurement of a channel corresponding to the set of data resource elements; and estimating the first scrambling sequence based at least in part on the measurement of the channel.

Aspect 18: The method of aspect 17, further comprising: transmitting, to the first wireless device, an indication of a capability of the second wireless device to blindly estimate the first scrambling sequence, wherein estimating the first scrambling sequence is based at least in part on the capability.

Aspect 19: The method of any of aspects 13 through 18, wherein the first scrambling sequence is used to decode the data for one group of symbol periods.

Aspect 20: The method of aspect 19, wherein the group of symbol periods comprises one slot.

Aspect 21: The method of any of aspects 13 through 20, wherein a peak-to-average-power ratio for the data from each of the one or more symbol periods satisfies a threshold value or is a minimum value for the peak-to-average-power ratio among a set of peak-to-average-power ratios.

Aspect 22: The method of any of aspects 13 through 21, wherein identifying the first scrambling sequence is based at least in part on a modulation order of the set of data resource elements having a number of points that satisfies a threshold number of points.

Aspect 23: An apparatus for wireless communications at a first wireless device, comprising a processor; memory coupled with the processor; and instructions stored in the memory and executable by the processor to cause the apparatus to perform a method of any of aspects 1 through 12.

Aspect 24: An apparatus for wireless communications at a first wireless device, comprising at least one means for performing a method of any of aspects 1 through 12.

Aspect 25: A non-transitory computer-readable medium storing code for wireless communications at a first wireless device, the code comprising instructions executable by a processor to perform a method of any of aspects 1 through 12.

Aspect 26: An apparatus for wireless communications at a second wireless device, comprising a processor; memory coupled with the processor; and instructions stored in the memory and executable by the processor to cause the apparatus to perform a method of any of aspects 13 through 22.

Aspect 27: An apparatus for wireless communications at a second wireless device, comprising at least one means for performing a method of any of aspects 13 through 22.

Aspect 28: A non-transitory computer-readable medium storing code for wireless communications at a second wireless device, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
   receiving, from a second wireless device, an indication of a capability of the second wireless device to blindly estimate a first scrambling sequence from a set of candidate scrambling sequences;
   selecting the first scrambling sequence from the set of candidate scrambling sequences based at least in part on a value of a non-linearity parameter for a set of data resource elements for transmitting data in one or more symbol periods, a set of pilot resource elements for transmitting demodulation reference signals associated with the data in the one or more symbol periods, and the indication;
   encoding the data for the set of data resource elements according to the first scrambling sequence; and
   transmitting, in the one or more symbol periods, the set of data resource elements with the set of pilot resource elements.

2. The method of claim 1, further comprising:
   transmitting, to a second wireless device, control signaling indicating the first scrambling sequence.

3. The method of claim 2, wherein transmitting the control signaling comprises:
   transmitting a DCI message comprising one or more bits indicating the first scrambling sequence, wherein the second wireless device is a user equipment (UE).

4. The method of claim 2, wherein transmitting the control signaling comprises:
   transmitting an UCI message comprising one or more bits indicating the first scrambling sequence, wherein the second wireless device is a base station.

5. The method of claim 1, further comprising:
   performing, for each set of one or more symbol periods, an estimation procedure to evaluate the non-linearity parameter corresponding to each scrambling sequence from the set of candidate scrambling sequences for the one or more symbol periods; and
   identifying the first scrambling sequence based at least in part on performing the estimation procedure.

6. The method of claim 5, wherein performing the estimation procedure comprises:
   determining, for each set of one or more symbol periods, a plurality of peak-to-average power ratios corresponding to the set of candidate scrambling sequences; and
   selecting the first scrambling sequence based at least in part on comparing the plurality of peak-to-average power ratios corresponding to the set of candidate scrambling sequences.

7. The method of claim 6, wherein a first peak-to-average-power ratio of the first scrambling sequence is a lowest value of the plurality of peak-to-average power ratios.

8. The method of claim 1, wherein selecting the first scrambling sequence from the set of candidate scrambling sequences is performed once per group of symbol periods.

9. The method of claim 8, wherein the group of symbol periods comprises one slot.

10. The method of claim 1, wherein a peak-to-average-power ratio for the data from each of the one or more symbol periods encoded according to the first scrambling sequence satisfies a threshold value or is a minimum value for the peak-to-average-power ratio among a set of peak-to-average-power ratios.

11. The method of claim 1, wherein selecting the first scrambling sequence is based at least in part on a modulation order of the set of data resource elements having a number of points that satisfies a threshold number of points.

12. A method for wireless communications at a second wireless device, comprising:
   transmitting, to a first wireless device, an indication of a capability of the second wireless device to blindly estimate a first scrambling sequence from a set of candidate scrambling sequences;
   receiving, from the first wireless device, a set of data resource elements in one or more symbol periods, the set of data resource elements comprising data and a set of pilot resource elements comprising demodulation reference signals associated with the data in the one or more symbol periods;
   estimating, from the set of candidate scrambling sequences, the first scrambling sequence used by the first wireless device to scramble the data; and
   decoding the data of the set of data resource elements according to the first scrambling sequence.

13. The method of claim 12, wherein identifying the first scrambling sequence comprises:
   receiving, from the first wireless device, control signaling indicating the first scrambling sequence.

14. The method of claim 13, wherein receiving the control signaling comprises:
   receiving a DCI message comprising one or more bits indicating the first scrambling sequence, wherein the first wireless device is a base station.

15. The method of claim 13, wherein receiving the control signaling comprises:
   receiving an UCI message comprising one or more bits indicating the first scrambling sequence, wherein the first wireless device is a user equipment (UE).

16. The method of claim 12, further comprising:
performing a measurement of a channel corresponding to the set of data resource elements,
wherein the first scrambling sequence is estimated based at least in part on the measurement of the channel.

17. The method of claim 12, wherein the first scrambling sequence is used to decode the data for one group of symbol periods.

18. The method of claim 17, wherein the group of symbol periods comprises one slot.

19. The method of claim 12, wherein a peak-to-average-power ratio for the data from each of the one or more symbol periods satisfies a threshold value or is a minimum value for the peak-to-average-power ratio among a set of peak-to-average-power ratios.

20. The method of claim 12, wherein identifying the first scrambling sequence is based at least in part on a modulation order of the set of data resource elements having a number of points that satisfies a threshold number of points.

21. A first wireless device for wireless communications, comprising:
one or more memories storing processor-executable code; and
one or more processors coupled with the one or more memories and individually or collectively operable to execute the code
to cause the first wireless device to:
receive, from a second wireless device, an indication of a capability of the second wireless device to blindly estimate a first scrambling sequence from a set of candidate scrambling sequences;
select the first scrambling sequence from the set of candidate scrambling sequences based at least in part on a value of a non-linearity parameter for a set of data resource elements for transmitting data in one or more symbol periods, a set of pilot resource elements for transmitting demodulation reference signals associated with the data in the one or more symbol periods, and the indication;
encode the data for the set of data resource elements according to the first scrambling sequence; and
transmit, in the one or more symbol periods, the set of data resource elements with the set of pilot resource elements.

22. The first wireless device of claim 21, wherein the one or more processors are individually or collectively operable to execute the code to cause the first wireless device to:
transmit, to a second wireless device, control signaling indicating the first scrambling sequence.

23. The first wireless device of claim 21, wherein the one or more processors are individually or collectively operable to execute the code to cause the first wireless device to:
perform, for each set of one or more symbol periods, an estimation procedure to evaluate the non-linearity parameter corresponding to each scrambling sequence from the set of candidate scrambling sequences for the one or more symbol periods; and
identify the first scrambling sequence based at least in part on performing the estimation procedure.

24. A second wireless device for wireless communications, comprising:
one or more memories storing processor-executable code; and
one or more processors coupled with the one or more memories and individually or collectively operable to execute the code
to cause the second wireless device to:
transmit, to a first wireless device, an indication of a capability of the second wireless device to blindly estimate a first scrambling sequence from a set of candidate scrambling sequences;
receive, from the first wireless device, a set of data resource elements in one or more symbol periods, the set of data resource elements comprising data and a set of pilot resource elements comprising demodulation reference signals associated with the data in the one or more symbol periods;
estimate, from the set of candidate scrambling sequences, the first scrambling sequence used by the first wireless device to scramble the data; and
decode the data of the set of data resource elements according to the first scrambling sequence.

25. The second wireless device of claim 24, wherein, to identify the first scrambling sequence, the one or more processors are individually or collectively operable to execute the code to cause the first wireless device to:
receive, from the first wireless device, control signaling indicating the first scrambling sequence.

26. The second wireless device of claim 24, wherein the one or more processors are individually or collectively operable to execute the code to cause the second wireless device to:
perform a measurement of a channel corresponding to the set of data resource elements,
wherein the first scrambling sequence is estimated based at least in part on the measurement of the channel and the capability.

* * * * *